US012730183B2

(12) United States Patent
Buddhikot et al.

(10) Patent No.: US 12,730,183 B2
(45) Date of Patent: Sep. 8, 2026

(54) TRANSMITTER DETECTION IN SHARED SPECTRUM BAND

(71) Applicant: Nokia Solutions and Networks Oy, Espoo (FI)

(72) Inventors: Milind Buddhikot, Murray Hill, NJ (US); Shamik Sarkar, Murray Hill, NJ (US); Aniqua Baset, Murray Hill, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 352 days.

(21) Appl. No.: 18/566,979

(22) PCT Filed: Jun. 8, 2021

(86) PCT No.: PCT/US2021/036327
§ 371 (c)(1),
(2) Date: Dec. 4, 2023

(87) PCT Pub. No.: WO2022/260651
PCT Pub. Date: Dec. 15, 2022

(65) Prior Publication Data

US 2024/0302488 A1 Sep. 12, 2024

(51) Int. Cl.
*G01S 7/02* (2006.01)
*H04L 27/00* (2006.01)

(52) U.S. Cl.
CPC .............. *G01S 7/023* (2013.01); *G01S 7/021* (2013.01); *H04L 27/0006* (2013.01)

(58) Field of Classification Search
CPC ....... G01S 7/023; G01S 7/021; H04L 27/0006
See application file for complete search history.

(56) References Cited

U.S. PATENT DOCUMENTS 7,606,193 B2 * 10/2009 McFarland ........... H04W 24/04 370/441
9,647,719 B2 5/2017 MacMullan et al.
(Continued)

FOREIGN PATENT DOCUMENTS

WO 2019/232004 A1 12/2019

OTHER PUBLICATIONS

Extended European Search Report received for corresponding European Patent Application No. 21945326.3, dated Jan. 31, 2025, 7 pages.

(Continued)

*Primary Examiner* — Marcus E Windrich
(74) *Attorney, Agent, or Firm* — Robert P. Michal, Esq.; Rimon PC

(57) ABSTRACT

An apparatus comprising one processor and one memory including computer program code to: generate at least one sample corresponding to at least one radar/non-radar signal; form at least one spectrogram using time and frequency domain characteristics of the sample; wherein the spectrogram is formed via subdividing an observation window of the sample into time slots of a given duration, computing a power spectral density for a subset of the time slots having a higher determined energy relative to other time slots, and combining one or more computed power spectral densities of the subset; pass the spectrogram to a model to detect a presence of the radar signal and classify the radar signal as either interference/noise or radar present, and estimate a (Continued)

bandwidth of the detected radar signal; and determine the radar signal to be in-band or out-of-band relative to a shared spectrum hand, based on the estimated bandwidth.

11 Claims, 8 Drawing Sheets

(56) References Cited

U.S. PATENT DOCUMENTS

| | | | | |
|---|---|---|---|---|
| 2003/0107512 | A1* | 6/2003 | McFarland | H04K 3/822 342/52 |
| 2008/0002606 | A1* | 1/2008 | Cheung | H04W 24/00 370/328 |
| 2009/0286480 | A1* | 11/2009 | Cho | H04W 16/14 455/62 |
| 2015/0078346 | A1* | 3/2015 | Farhadi | H04W 52/244 370/336 |
| 2017/0195887 | A1 | 7/2017 | Jovancevic | |
| 2018/0017663 | A1 | 1/2018 | Al-Mufti et al. | |
| 2019/0165827 | A1* | 5/2019 | Churan | H04W 16/14 |
| 2019/0254047 | A1 | 8/2019 | Ahmed et al. | |
| 2021/0168008 | A1* | 6/2021 | Ohashi | G06N 3/09 |
| 2022/0260709 | A1* | 8/2022 | Lee | G01S 7/003 |
| 2022/0287035 | A1* | 9/2022 | Yang | H04L 5/001 |

OTHER PUBLICATIONS

Figueiredo et al., "A Spectrum Sharing Framework for Intelligent Next Generation Wireless Networks", IEEE Access, vol. 06, Oct. 9, 2018, pp. 60704-60735.

"Citizens Broadband Radio Service. Code of Federal Regulations", Code of Federal Regulations (CFR), Title 47, Part 96, 2016, pp. 1-24.

Sanders et al., "Procedures for laboratory testing of environmental sensing capability sensor devices", NTIA Technical Memorandum 18-527, Nov. 2017, 36 pages.

Lees et al., "Deep Learning Classification of 3.5-GHz Band Spectrograms With Applications to Spectrum Sensing", IEEE Transactions on Cognitive Communications and Networking, vol. 5, No. 2, Jun. 2019, pp. 224-236.

Selim et al., "Spectrum monitoring for radar bands using deep convolutional neural networks", IEEE Global Communications Conference, Dec. 4-8, 2017, 6 pages.

Caromi et al., "Detection of Incumbent Radar in the 3.5 GHz CBRS Band using Support Vector Machines", Sensor Signal Processing for Defence Conference (SSPD), May 9-10, 2019, 5 pages.

Caromi et al., "Detection of incumbent radar in the 3.5 GHz CBRS band", IEEE Global Conference on Signal and Information Processing (GlobalSIP), Nov. 26-29, 2018, pp. 241-245.

Redmon et al., "You only look once: Unified, real-time object detection", Proceedings of the IEEE Conference on Computer Vision and Pattern Recognition (CVPR), 2016, pp. 779-788.

"Artificial Intelligence Radio Transceiver (AIR-T)", deepwavedigital, Retrieved on Dec. 13, 2023, Webpage available at : https://deepwavedigital.com/hardware-products/sdr/.

Nguyen et al., "3.5 GHz environmental sensing capability sensitivity requirements and deployment", IEEE International Symposium on Dynamic Spectrum Access Networks (DySPAN), Mar. 6-9, 2017, 10 pages.

International Search Report and Written Opinion received for corresponding Patent Cooperation Treaty Application No. PCT/US2021/036327, dated Sep. 17, 2021, 24 pages.

* cited by examiner

196, CU
150-2
RAN NODE 170
MODULE
PROCESSOR(S)
150-1
152
MEMORY(IES)
COMPUTER PROGRAM CODE
MODULE
155
153
157
198
N/W I/F(S)
161
162
Tx, 163
Rx, 162
160
195, RRH OR DU/RU
158
111
176
TO/FROM OTHER RAN NODES
131
NETWORK ELEMENT(S) 190
PROCESSOR(S)
175
MEMORY(IES)
COMPUTER PROGRAM CODE
171
173
185
N/W I/F(S)
180
181
OTHER NETWORK(S)/ INTERNET
128
UE 110
Tx, 133
Rx, 132
130
127
140-1
120
MODULE
PROCESSOR(S)
MEMORY(IES)
COMPUTER PROGRAM CODE
MODULE
140-2
125
123
100

TRANSMITTER DETECTION IN SHARED SPECTRUM BAND

STATEMENT OF GOVERNMENT SUPPORT

This invention was made with Government support under Grant No. CNS 1563928 awarded by the United States National Science Foundation (US NSF). The Government has certain rights in this invention.

RELATED APPLICATION

This application was originally filed as PCT Application No. PCT/US2021/036327, filed on Jun. 8, 2021, which is incorporated herein by reference in its entirety.

TECHNICAL FIELD

The examples and non-limiting embodiments relate generally to communications and, more particularly, to a deep-learning-based transmitter detection capability instantiated for a specific case of an environmental sensing capability sensor design for a shared spectrum band.

BACKGROUND

It is known to allocate spectrum access in a communication network.

SUMMARY

In accordance with an example aspect, there is provided an apparatus comprising at least one processor; and at least one memory including computer program code; the at least one memory and the computer program code configured to, with the at least one processor, cause the apparatus at least to perform: generate at least one sample corresponding to at least one radar signal or at least one non-radar signal; form at least one spectrogram using time domain and frequency domain characteristics of the at least one sample; wherein the at least one spectrogram is formed as a result of subdividing an observation window of the at least one sample into a number of time slots of a given duration, computing a power spectral density for a subset of the time slots having a higher determined energy relative to other time slots, and combining one or more computed power spectral densities of the subset; pass the at least one spectrogram to a model to detect a presence of the at least one radar signal and to further classify the at least one radar signal as either interference/noise or radar present, and to estimate a bandwidth of the at least one radar signal that has been detected; and determine the at least one radar signal to be in-band or out-of-band relative to a shared spectrum band, based on the estimated bandwidth of the at least one radar signal.

In accordance with an example aspect, there is provided an apparatus comprising means for performing: generating at least one sample corresponding to at least one radar signal or at least one non-radar signal; forming at least one spectrogram using time domain and frequency domain characteristics of the at least one sample; wherein the at least one spectrogram is formed as a result of subdividing an observation window of the at least one sample into a number of time slots of a given duration, computing a power spectral density for a subset of the time slots having a higher determined energy relative to other time slots, and combining one or more computed power spectral densities of the subset; passing the at least one spectrogram to a model to detect a presence of the at least one radar signal and to further classify the at least one radar signal as either interference/noise or radar present, and to estimate a bandwidth of the at least one radar signal that has been detected; and determining the at least one radar signal to be in-band or out-of-band relative to a shared spectrum band, based on the estimated bandwidth of the at least one radar signal.

In accordance with an example aspect, there is provided a method comprising: generating at least one sample corresponding to at least one radar signal or at least one non-radar signal; forming at least one spectrogram using time domain and frequency domain characteristics of the at least one sample; wherein the at least one spectrogram is formed as a result of subdividing an observation window of the at least one sample into a number of time slots of a given duration, computing a power spectral density for a subset of the time slots having a higher determined energy relative to other time slots, and combining one or more computed power spectral densities of the subset; passing the at least one spectrogram to a model to detect a presence of the at least one radar signal and to further classify the at least one radar signal as either interference/noise or radar present, and to estimate a bandwidth of the at least one radar signal that has been detected; and determining the at least one radar signal to be in-band or out-of-band relative to a shared spectrum band, based on the estimated bandwidth of the at least one radar signal.

In accordance with an example aspect, there is provided a computer readable medium comprising program instructions for causing an apparatus to perform at least the following: generating at least one sample corresponding to at least one radar signal or at least one non-radar signal; forming at least one spectrogram using time domain and frequency domain characteristics of the at least one sample; wherein the at least one spectrogram is formed as a result of subdividing an observation window of the at least one sample into a number of time slots of a given duration, computing a power spectral density for a subset of the time slots having a higher determined energy relative to other time slots, and combining one or more computed power spectral densities of the subset; passing the at least one spectrogram to a model to detect a presence of the at least one radar signal and to further classify the at least one radar signal as either interference/noise or radar present, and to estimate a bandwidth of the at least one radar signal that has been detected; and determining the at least one radar signal to be in-band or out-of-band relative to a shared spectrum band, based on the estimated bandwidth of the at least one radar signal.

BRIEF DESCRIPTION OF THE DRAWINGS

The foregoing aspects and other features are explained in the following description, taken in connection with the accompanying drawings.

DETAILED DESCRIPTION OF EXAMPLE EMBODIMENTS

Figure 1:
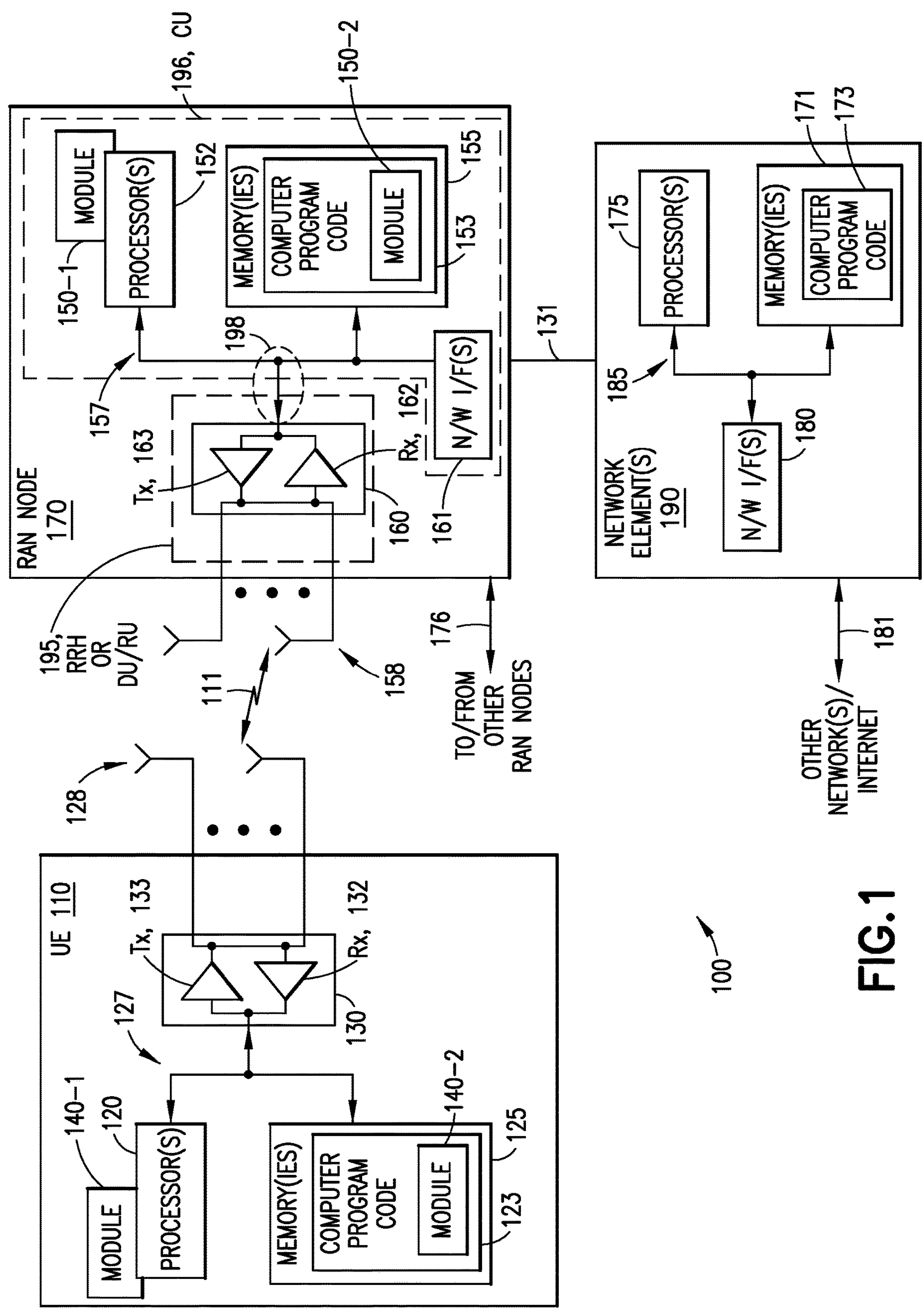
FIG. 1 is a block diagram of one possible and non-limiting system in which the example embodiments may be practiced.

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface (such as connection 131) to a 5GC (such as, for example, the network element(s) 190). The ng-eNB is a node providing E-UTRA user plane and control plane protocol terminations towards the UE, and connected via the NG interface (such as connection 131) to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that control the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell may be supported with one gNB-DU 195, or one cell may be supported/shared with multiple DUs under RAN sharing. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses

157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

It is noted that the description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. Such core network functionality may include SON (self-organizing/optimizing network) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, non-transitory memory, transitory memory, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, head mounted displays such as those that implement virtual/augmented/mixed reality, as well as portable units or terminals that incorporate combinations of such functions.

UE 110, RAN node 170, and/or network element(s) 190, (and associated memories, computer program code and modules) may be configured to implement (e.g. in part) the methods described herein, including a deep-learning-based environmental sensing capability sensor design for a shared spectrum band, such as the 3.5 GHz CBRS band. Thus, computer program code 123, module 140-1, module 140-2, and other elements/features shown in FIG. 1 of UE 110 may implement user equipment related aspects of the methods described herein. Similarly, computer program code 153, module 150-1, module 150-2, and other elements/features shown in FIG. 1 of RAN node 170 may implement gNB/TRP related aspects of the methods described herein, such as CBSD related aspects. Computer program code 173 and other elements/features shown in FIG. 1 of network element(s) 190 may be configured to implement network element related aspects of the methods described herein, such as ESC related aspects.

Having thus introduced a suitable but non-limiting technical context for the practice of the example embodiments, the example embodiments are now described with greater specificity.

Figure 2:
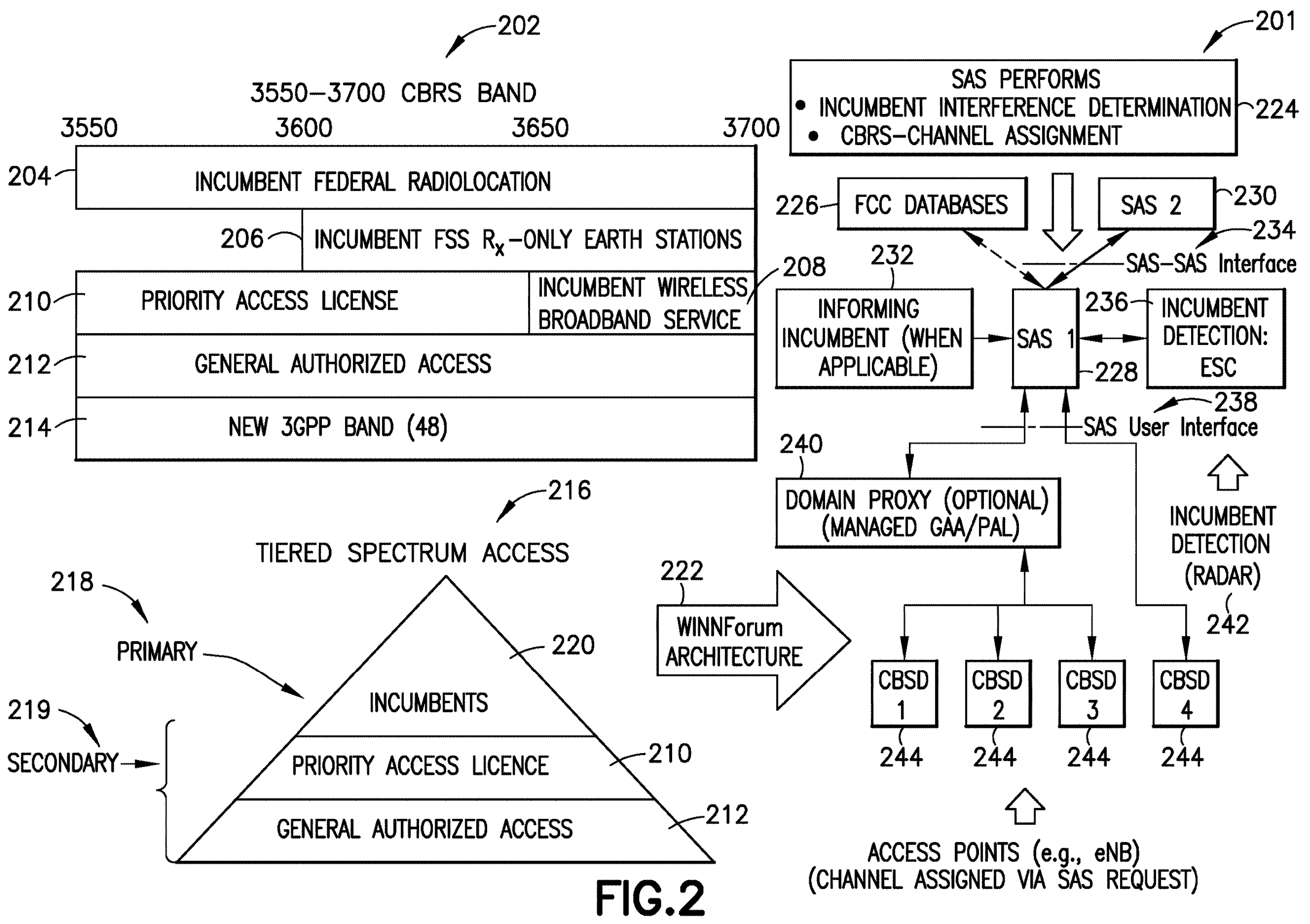
FIG. 2 illustrates US 3.5 GHz Citizens Broadband Radio Service (CBRS) tiered access and an E2E architecture for its implementation in wireless networks.

With reference to FIG. 2, as the first step towards the goal of releasing 500 MHz of new spectrum for commercial use, starting late 2013, the FCC targeted release of the 3550-3700 MHz band 202 used primarily by high-powered Department of Defense (DoD) radar systems for ground-based, shipboard, and airborne platforms and non-federal Fixed Satellite Service (FSS) earth stations. The FCC has announced a set of rules, known as Citizens Broadband Radio Service (CBRS), codified as 47 CFR Part 96 rules, for commercial wireless usage in a 150 MHz band from 3.55-3.70 GHz (202). The basic CBRS rule is that this 3.5 GHz band can be used for commercial usage by the secondary users (SU) 219, when it is not being used by the incumbent users (IU) 220.

Some of the aspects of the innovative framework in the Part 96 rules are as follows: (1) The rules require a spectrum access system (SAS) (228, 230) to implement an innovative three-tiered (216) spectrum management system (201, 224) (FIG. 2)—dynamic incumbents 220 in the top tier, Priority Access License (PAL) users 210 in the second tier and Generalized Authorized Access (GAA) users 212 in the third tier. The incumbents which have the highest priority spectrum access (primary 218), can require all secondary systems in a spatial region to relinquish all or portions of spectrum at any time. The secondary devices 219 from the PAL tier 210 are allocated exclusive channels that provide guaranteed interference protection, much like traditional long term licenses. The GAA tier 212 provides no interference protection and therefore, allows multiple independent networks to use a given channel not used by an incumbent 220 or PAL user 210. (2) The rules define PAL licenses in terms of 10 MHz spectrum blocks allocated for a 10 year duration over spatial regions as small as a US county. A PAL owner 210 can acquire multiple PAL licenses and stack them together in space and time to create up to 40 MHz of spectrum chunks, valid over a very large spatial region. (3) Out of 150 MHz spectrum in 3550-3700 MHz 202, 70 MHz is reserved for PAL 210 and remaining 80 MHz is available for GAA devices 212. The FCC also advocates a "use-it-or-share-it" rule that allows unused portions of PAL channels to be used as GAA channels.

As further shown in FIG. 2, the incumbent tier 220 includes incumbent federal radiolocation devices 204, incumbent FSS Rx-only earth stations 206, and an incumbent wireless broadband service 208. Within the 3550-3700 CBRS band 202 is a tier 214 associated with the new 3GPP band (48).

FIG. 2 also illustrates an end-to-end CBRS architecture 201 standardized with the WINNForum standards body 222.

Here, at 224, the SAS (228, 230) performs operations such as (1) incumbent interference determination and (2) CBRS channel assignment. Elements in the architecture 201 comprise (a) FCC databases 226 that provide information on static incumbents such as FSS sites; (b) multiple SAS (SAS 1 228 and SAS 2 230, interconnected through an SAS-SAS interface 234); (c) informing incumbent 232 (when applicable) which is an interface (such as a calendar service) to inform SAS (228, 230) of a dynamic addition of a new incumbent or activation of an existing incumbent; (d) incumbent detection ESC (environmental sensing capability) 236, which performs dynamic incumbent detection, specifically naval (radar) operating in the 3550-3650 MHz portion of the CBRS band; (e) an optional domain proxy (DP) 240 (e.g., managed GAA/PAL) as an intermediary between SAS (228, 230) and a collection of multiple CBSDs 244 (CBSD 1, 2, and 3, and a CBSD 4 in FIG. 2). The SAS user interface 238 may be implemented as the interface between the SAS (228, 230) and the domain proxy 240 and/or the incumbent detection (radar) 242. The CBSDs 244 may be access points, e.g. eNB 170, where a channel is assigned via a SAS request.

At 242, the ESC sensors detect the presence of the incumbent (naval radar ship), and relay that information to the SAS (228, 230), where the SAS ensures that if the incumbent were to show up it has the first right to use the channels, and all other secondary users 219 are instructed to use a different channel as per the standards defined by the WINNForum 222 to enforce dynamic and static protection area for the incumbent 220. The onus of protecting the incumbents 220 from interference from secondary users 219 is on the spectrum access system (SAS) (228, 230), the central component in the CBRS ecosystem. Since the FSS transceivers are static, incumbent protection for them can be implemented using geolocation databases. In contrast, incumbent protection for DoD radars is much more challenging because the radar transceivers, mounted on naval ships, are mobile. The FCC has proposed deploying environmental sensing capability (ESC) 236, with multiple ESC sensors placed in coastal areas to detect naval radar signals and report those to the SAS (228, 230) in a timely fashion. Based on the reported radar information from the ESC 236 and the ESC's location, the SAS (228, 230) relocates the active CBRS devices (CBSD) that might interfere with the detected radar signal, to different frequencies. Given the spectrum sharing opportunity enabled by CBRS, there is a lot of interest in building ESC systems.

Figure 3:
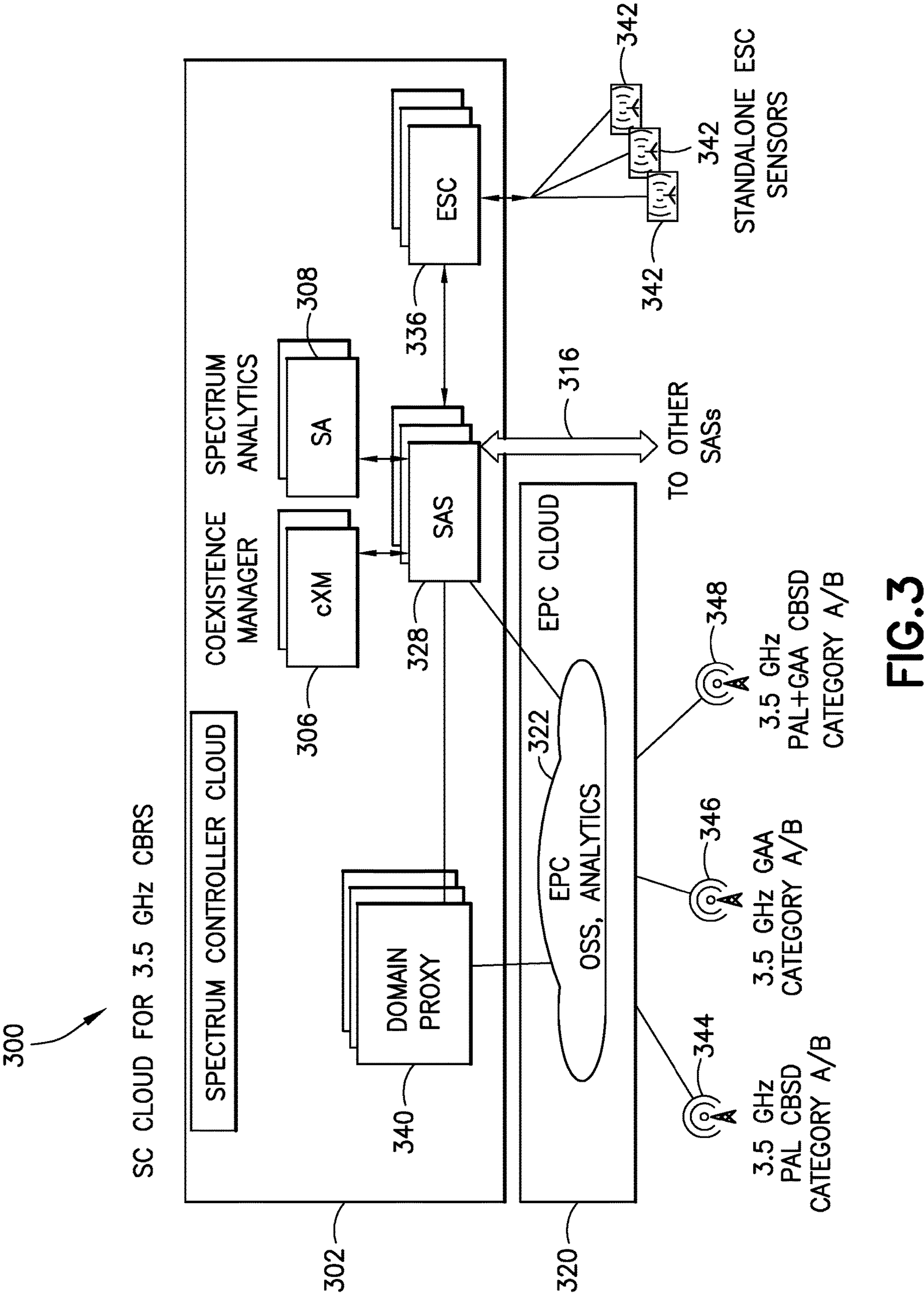
FIG. 3 shows a controller (an SC) providing the various building blocks of the CBRS shared spectrum.

FIG. 3 shows the manifestation 300 of a spectrum controller (SC) 302 providing the various building blocks of the CBRS shared spectrum architecture. Such a spectrum controller can provide CBRS spectrum to private enterprise networks deployment for a new verticals market segment besides the traditional MNO/MSO market segment.

As shown in FIG. 3, included in the spectrum controller cloud 302 is an SAS 328, which ensures that if the incumbent were to show up it has the first right to use the channels, and all other secondary users 219 are instructed to use a different channel as per the standards defined by the WINNForum 222. The (optional) coexistence manager 306 and spectrum analytics are coupled to the SAS 328. ESC 336 performs dynamic incumbent detection. The standalone ESC sensors 342 detect the presence of the incumbent, and relay that information to the ESC 336. The ESC 336 relays information obtained from the standalone ESC sensors 342 to the SAS 328. The interface 316 enables communication between SAS 328 and other SASs.

The domain proxy 340 serves as an intermediary between SAS 328 and the EPC cloud 320. The EPC cloud 320 provides EPC core functions, OSS and analytics 322 (such as an LTE core, a 4G core, a 5G core, future core networks, etc.), and provides access to multiple CBSDs, including 344 (3.5 GHZ PAL CBSD category A/B), 346 (3.5 GHz GAA category A/B), and 348 (3.5 GHz PAL+GAA CBSD category A/B).

Clearly, ESC 336 is a critical technology in the spectrum controller (SC) cloud solution 302 that implements the E2E CBRS 201 solution.

This technology can be easily extended to other spectrum bands such as 3.1 to 3.4 GHz and 3.45 to 3.55 GHz where spectrum needs to be shared with dynamic incumbents. Such shared spectrum bands are a critical component as 5G networks evolve and 6G networks are designed.

Radars in CBRS bands generally operate in 3550-3650 MHz. The technique described herein is not restricted to 3 bands between (3 GHz to 4 GHz), and may apply to any or all chunks of wireless spectrum. The CBRS band is 3550-3700 MHz, but the dynamic radar detection in CBRS and therefore the ESC sensor as described herein is applicable to the bottom 100 MHz (3550-3650 MHz). As such the examples described herein are relevant for that part. The examples described herein consider the 3550-3650 MHz band and on the ESC certification criteria. Further, the examples described herein are related to performing signal detection and bandwidth estimation simultaneously. I.e., the methods do not necessarily first detect the signal as radar and then estimate the bandwidth. Instead, the model described herein determines whether there is radar or not, and if radar is present, the bandwidth of the radar. Detection and estimation are performed simultaneously.

The design and implementation of an ESC 336 poses several challenges. First, the naval radar transmitter emits low duty cycle (ratio of pulse ON time to OFF time) pulses, while being mobile and its antenna rotating 360 degrees around its axis. Furthermore, the ESC cannot track/localize the transmitter as storing information about the radar transmitter's movement/position is not allowed. Therefore, an ESC is illuminated only for a short duration by the narrow radar pulses, at unknown times. Hence, the ESCs must continuously monitor the 3.5 GHz band and simultaneously analyze the captured signals with a high temporal resolution.

This is especially challenging as the ESC must sample at a high RF sampling rate due to the 100 MHz wide bandwidth. The radar signals can appear anywhere on this band, and the ESC must detect them with 99% accuracy for adherence to the ESC certification criteria. Second, the ESC must accurately estimate the spectrum occupied by the radar signals, which is essential for incumbent protection and efficient spectrum sharing. There are five different radar types, with bandwidth in the range of 1-100 MHz, that can appear in the 3.5 GHz band. While different radar types have different spectral characteristics, the ESC must estimate the unknown radar spectral occupancy without any prior knowledge of the type of the incumbent radar. Third, the ESC must detect the radar signals and estimate their spectral occupancy, not just in the presence of receiver noise, but also in the presence of interference of unknown characteristics from LTE eNodeBs that are opportunistically operating in the CBRS band. Last, the ESC must distinguish between in-band (3.5 GHz) radar signals and out-of-band (OoB) radar signals. There might be high power radar signals outside the 3.55-3.65 GHz band, with substantial side lobe power in the 3.5 GHz band. The ESC should not incorrectly detect these OoB radars as in-band radar, which could lead to underutilization of the CBRS spectrum.

ESC certification criteria: An ESC 336 must detect radar pulse bursts, for all five radar types, with at least 99% accuracy when the peak power of the radar pulses is −89 dBm/MHz (or more) and the average power of the aggregate interference is −109 dBm/MHz (or less). The accuracy is defined in terms of detecting radar pulse bursts, not individual pulses. During the certification test, once a pulse burst is fed to the ESC, the ESC must detect it within 5 see without knowing precisely when the burst was fed. The radar pulse parameters are different across radar pulse bursts, but the same for all the pulses in a single burst. Additive white Gaussian noise (AWGN), used to mimic aggregate CBSD interference is applied across the whole 100 MHz CBRS band, during the testing.

There are different approaches for spectrum sensing specifically for the ESC. A deep-learning-based binary classification can be used, based on actual radar recordings from the coastal areas, with receiver bandwidth wider than the 3.5 GHz band, to differentiate between in-band and OoB radar signals. Their collected data can be augmented by incorporating LTE and AWGN interference. Supervised learning can be performed on this augmented data set using support vector machines (SVM) with features like higher-order statistics and peak statistics. A combination of signal amplitude and phase difference can also be used. Matched filtering can detect radar signals with knowledge about the radar pulse characteristics. However, none of these approaches provide a complete solution, design and implementation that meets all the ESC certification requirements. For example, some approaches only consider radar type 1 among the five possible types, some do not consider any CBSD interference, while others assume knowledge about radar pulse parameters, which is not the case in an ESC certification test, especially when all radar types are considered together. Moreover, none of these approaches accurately estimate the bandwidth of radar signals. The radar bandwidth is estimated at a coarse level using ten detectors running serially or in parallel.

There have been developed ESCs that have been certified, including those that use a matched-filtering approach for detecting radar signals. However, given the wide range of variation possible in the radar pulse parameters, across five radar types, matched-filtering would require a brute force search over a huge number of filter coefficients. Another option is to use a peak detection approach that depends on various thresholds and stored signal fingerprints. Choosing these thresholds and parameters can be difficult in an environment with dynamic interference.

Described herein is a deep-learning method, termed spectrogram image learning (SIL), for solving the problems of detecting radar signals as well as estimating their spectral occupancy. SIL is based on the 'You Only Look Once' (YOLO) algorithm. In the training phase, SIL learns an object detection model using spectrograms, based on both radar and non-radar data. The spectrograms are two-dimensional images with frequency and time along the width and height of the images, respectively. The ESC certification requirement of 99% detection accuracy at 20 dB peak-to-average signal-to-interference ratio (SIR), per MHz, puts a constraint on the width of the spectrograms. This constraint makes the spectrograms narrow and tall, with the radar information only in a few rows of the spectrograms. The method described herein comprises skipping computing some of the non-radar rows, both in the training and the online phase. Skipping certain rows of the spectrograms allows robust adaptation to the ESC's available computing resources and ensure timely predictions in the online phase. In the training phase, the method determines how the non-deterministic aggregation of LTE signals at the ESC would affect the spectrograms in SIL, and trains SIL accordingly to withstand a diverse set of interference that an ESC may encounter in a deployment.

During the online phase, first formed are spectrograms based on the sensing data. While forming the spectrograms, computing certain rows are skipped based on the parameters determined in the training phase. Then, the spectrograms are fed to SIL that makes predictions based on the learned model. SIL is fast as it simultaneously detects radar signals and estimates their spectral occupancy using a single pass of the input spectrograms through a single convolutional neural network (CNN). This aspect of SIL and the skipping strategy ensures continuous real-time operability of the system with high temporal and spectral resolution. On detection of a radar signal, if the majority of its estimated bandwidth is outside the 3.5 GHz band, it is considered as an OoB radar; otherwise, as an in-band radar. To be able to make this distinction, a larger 125 MHz band centered at 3.6 GHz is monitored.

Further described herein is an embedded implementation of the system. Different commercial-off-the-shelf (COTS) software-defined radios (SDR) were analyzed in terms of their suitability for ESC operations, and based on this analysis an AIR-T is selected as the SDR for the implementation. The implementation described herein meets the performance requirement for ESC certification while maintaining continuous operability, i.e., providing timely predictions, with no memory overflow, and keeping up with the sampling rate of the ESC.

In summary, the examples described herein make the following contributions and have the following technical advantages and effects:

A novel deep-learning method for detecting radar signals and estimating their bandwidth is developed.

The required spectrogram width that ensures high radar detection accuracy is determined.

Computations in the system based on available computing resources are adapted.

A data augmentation approach for tackling unknown interference at the ESC is developed.

The system may be implemented on a COTS SDR.

The designed system described herein is termed DeepRadar. DeepRadar 400 is comprised of four constituent elements, shown in FIG. 4 as selection of spectrogram dimensions 410, adaptive computing 420, spectrogram image learning 422, and radar bandwidth estimation 430.

The input to DeepRadar 400 are the in-phase (I) 404 and phase-quadrature (Q) 406 values, obtained by sampling the captured RF signals. DeepRadar divides (412) these (I, Q) values in different contiguous observation windows 411, each of duration $t_o$ 416, and makes a prediction for each of them. In an example, the bandwidth of the ESC receiver (342, refer to FIG. 6) is 125 MHz. Hence, in this example, the sampling (quadrature sampling) rate of the ESC 336 is $S=125\times10^6$ samples/sec, where each sample is an (I, Q) tuple 403. The four constituent elements of DeepRadar are described in detail in the following four sections (1-4). Then described herein is how DeepRadar tackles unknown interference. An implementation example is also provided. First described is SIL, an element of DeepRadar.

Figure 4:
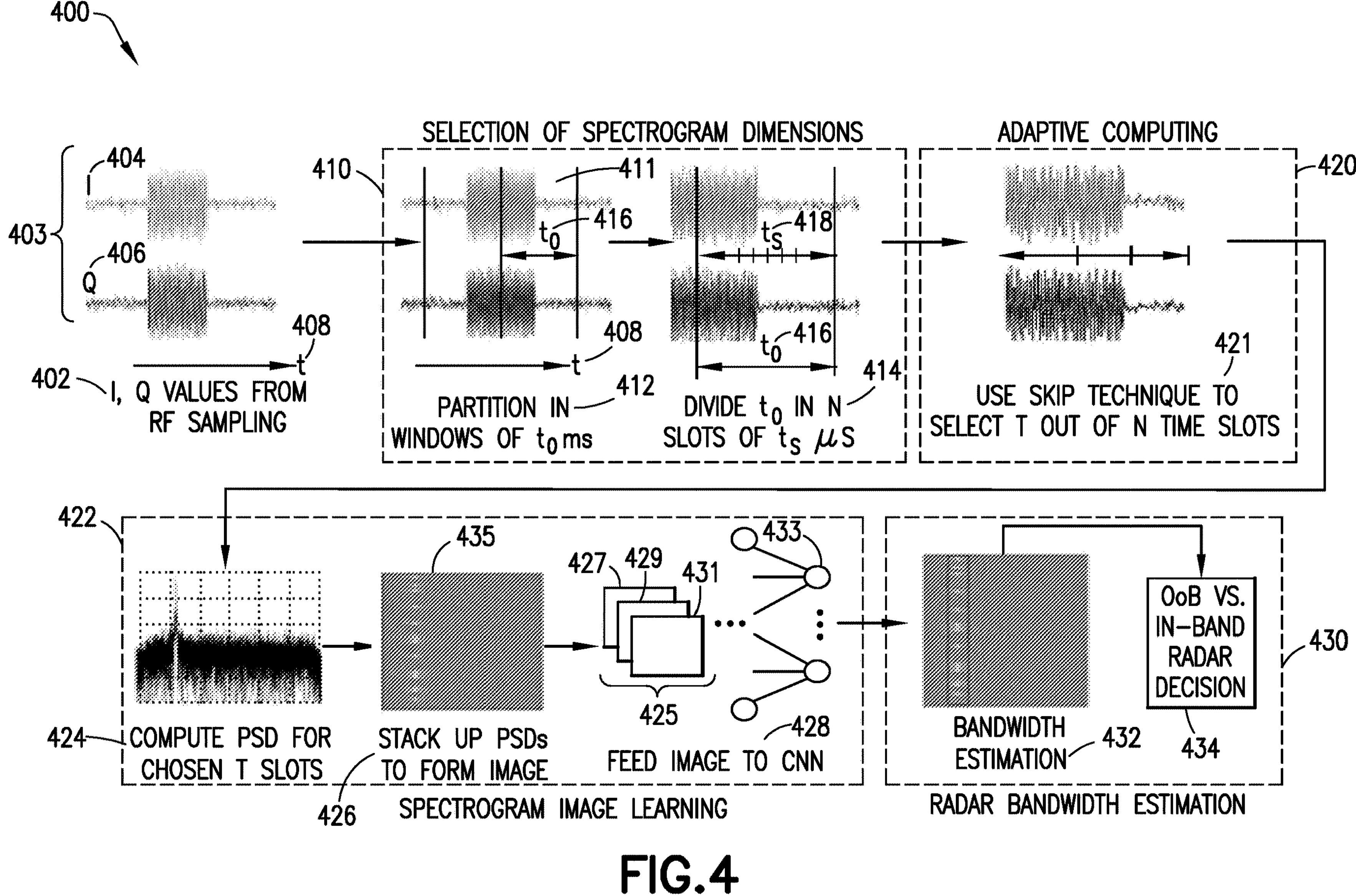
FIG. 4 is a flow diagram of the described deep radar method.

1. Spectrogram image learning (SIL): In SIL 422, spectrograms are used, where the spectrograms contain both time 408 and frequency domain characteristics of the captured signals, for simultaneously detecting radar signals and estimating their bandwidth. These spectrograms, used as features in SIL 422, are formed, as shown in FIG. 4. First, at 414, an observation window 411 is subdivided into N time slots, each of duration $t_s$ 418, such that $N\times t_s=t_o$. Next, at 424, the power spectral density (PSD) is computed for each of the time slots, and at 426 the PSDs are stacked up vertically to produce a spectrogram 435. Thus, a spectrogram 435 is a matrix of size N×M, whose rows and columns correspond to different time slots and frequency bins, respectively. Here, $M=S\times t_s$ is the number of (I, Q) samples in a time slot. Accordingly, M is also the number of frequency bins in a PSD. Given that a spectrogram 435 is an image whose pixel values represent signal power across different frequency bins and time slots, the task of spectrogram based radar detection can be considered an image classification problem. At 428, the spectrogram 435 is fed to a model 433 (e.g. a CNN) to classify the spectrogram 435. Items 427, 429, and 431 are different filters (collectively 425) in a CNN, and are part of the CNN 433.

Figure 5:
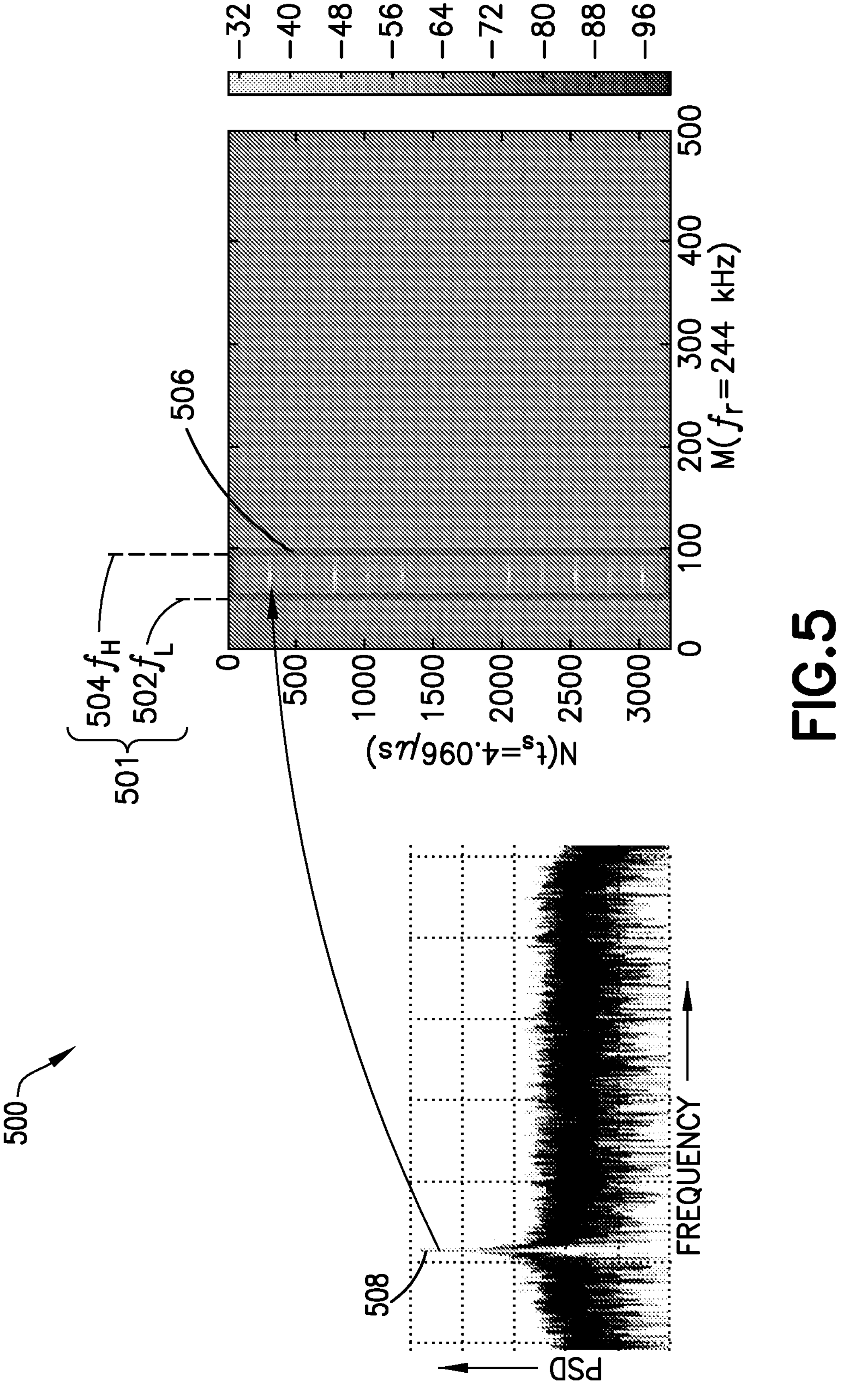
FIG. 5 shows object detection in SIL.

In an embodiment, SIL 422 is framed as a regression problem, instead of a classification problem, such that the regressor 433 can simultaneously detect the radar signals and estimate their bandwidth. Using training data, a model 433 is learned, the model being $m_{sil}$: $R^{N\times M}\rightarrow\{\mathcal{R}(f_L,f_H), \bar{\mathcal{R}}\}$, where $\mathcal{R}$ and $\bar{\mathcal{R}}$, denote the presence and absence of radar signals, respectively. When $m_{sil}$ detects a radar, it also produces a tuple ($f_L$, $f_H$) 501, estimating the lower and higher frequencies (respectively $f_L$ 502 and $f_H$ 504) of the detected radar signal's 3 dB bandwidth. It can be observed from FIG. 5 that the radar signal's estimated bandwidth can be represented as a rectangle 506, that is completely defined by ($f_L$, $f_H$) 501. This observation provides motivation to use object detection algorithms for solving the problem in SIL. In computer vision, object detection is the problem of learning a model that can detect different objects in an image, classify the detected objects, and estimate their locations in the image. If all the bright spots in a spectrogram are considered, produced by the radar pulses as shown in FIG. 5, as a single object, which are called a radar object, then a rectangle 506, as in FIG. 5, defines the radar object's location in the image. The purpose of radar detection and bandwidth estimation is served if these radar objects can be detected and localized. Thus, the learning problem in SIL can be converted to an object detection problem, if the bright spots are visible on the spectrograms.

In an example, YOLO may be used for object detection in SIL. YOLO detects objects faster in comparison to other detection algorithms because it requires only one pass of the input image 435 through a single neural network 433. Since the object detection task as described herein is simpler than the general object detection problem in computer vision, a simpler version of YOLO is developed in SIL. Simplifying the object detection task reduces SIL's prediction time further, which is an important consideration for the ESC 336. The following simplifications are made: i) Radar objects always have the same height as the image. The radar objects' height, which represents the duration of a pulse burst in an observation window, is not important as the ESC 336 only cares about the occurrence of pulse burst, not its duration or the exact time of occurrence. ii) Not used are anchor boxes that are used for localizing multiple overlapping objects of different shapes, because the occurrence of simultaneous radar signals with spectral overlap is not anticipated; an impractical scenario from the view point of radar operation. iii) Furthermore, multiple simultaneous radar signals are not expected to be in spectral proximity. Hence, one bounding box is used per cell. YOLO uses multiple bounding boxes per cell to detect multiple objects that are in proximity.

2. Selection of spectrogram dimensions (410): In DeepRadar 400, an observation window 411 is divided into time slots of duration $t_s$ 418. The value for $t_s$ must be selected carefully as SIL's accuracy depends on it. It can be observed from FIG. 5 that a bright spot 508 occurs in the spectrogram when a radar pulse's spectral components have higher power than the remaining spectral components in the PSD. SIL detects the collection of all the bright spots in a spectrogram as a radar object. Thus, SIL's success depends on the brightness of the spots relative to the spectrogram background. However, the brightness of the spots depends on $t_s$, as explained next.

The ESC certification criteria specifies that the radar pulses must be detected at 20 dB peak-to-average SIR, per MHz. Although 20 dB SIR implies higher radar power than interference, this is not reflected in the computed PSDs, when $t_s$ is large. When a PSD is computed using the (I, Q) samples of a time slot, the resulting PSD represents the captured signal's average power at different spectral components. Since the radar signals have a low duty cycle, their average power is much lower than their peak power when $t_s$ is large. Hence, with a large $t_s$, a 20 dB peak-to-average SIR, per MHz, between radar and interference signals, gets converted to a much lower average-to-average SIR, per MHz. Thus, a bound on $t_s$ is derived so that the average-to-average SIR, per MHz, is high. The examples described herein implement a 20 dB value as an example of an advantageous threshold value for use at least in the CBRS band. However, a different threshold value may also be implemented with the examples described herein.

Let s(t) be the radar signal with ON duration $t_{on}$, peak amplitude $x_r$, center frequency $f_c$ and bandwidth Δf Hz. The average power of s(t), averaged over $t_s$, is $$\bar{P}_r(t_s)=x_t^2\times\frac{t_{on}}{t_s}.$$

Using Parseval's theorem, $$\bar{P}_r(t_s) = x_t^2 \times \frac{t_{on}}{t_s} = x_f^2 \times \frac{\Delta f}{f_r} = x_f^2 \times \Delta f \times \frac{M}{S} \quad \text{(Equation 1)}$$

Here, S(f)=FFT{s(t)} and $x_f = \max_f S(f)$;

$$f \in \left[f_c - \frac{\Delta f}{2}, f_c + \frac{\Delta f}{2}\right].$$

$f_r$ is the frequency resolution of the FFTs. Next, the peak power of s(t), $\hat{P}_r$, is the square of the peak amplitude, i.e., $\hat{P}_r = x_t^2$. Using Equation 1, $$\hat{P}_r = \frac{x_f^2 \times M \times t_s \times \Delta f}{S \times t_{on}} \quad \text{(Equation 2)}$$

Next, consider y(t) as the aggregate interference signal. Using Parseval's theorem, its average power, $\bar{P}_y(t_s)$, is:

$$\bar{P}_y(t_s) = y_f^2 \times \frac{S}{f_r} = y_f^2 \times M \quad \text{(Equation 3)}$$

where $y_f$ is the value for each of the FFT bins in Y(f), the FFT of y(t). Here, y(t) is AWGN, used as a proxy for aggregate interference, present across the whole CBRS band. Hence, the spectrum in Y(f) is flat with the value for each of the bins approximately yr. The lowest peak-to-average SIR, per MHz, at which radar signals must be detected with high accuracy is 20 dB. Thus, $$10\log\left(\frac{\hat{P}_r}{\Delta f} \times 10^6\right) - 10\log\left(\frac{\bar{P}_y(t_s)}{S} \times 10^6\right) = 20 \quad \text{(Equation 4)}$$

In Equation 4, divide $\hat{P}_r$ by Δf to obtain the peak radar power per Hz, because s(t) is spread over Δf Hz. Divide $\bar{P}_y(t_s)$ by S to obtain the average interference power per Hz, as y(t) is spread over S Hz. Replacing, $\hat{P}_r$, and $\bar{P}_y(t_s)$ from Equation 2 and 3, respectively, in Equation 4, results in:

$$10\log\left(\frac{x_f^2 \times M \times t_s}{S \times t_{on}}\right) - 10\log\left(\frac{y_f^2 \times M}{S}\right) = 20$$

Further simplification of the above equation produces $$t_s = \frac{10^2 \times y_f^2 \times t_{on}}{x_f^2} \quad \text{(Equation 5)}$$

Now, to ensure the occurrence of the bright spots in the spectrograms, $x_f^2 >> y_f^2$ is required for the portion of the spectrum where radar signal is present. This margin is considered to be at least 5 dB, i.e., $10\log(x_f^2) - 10\log(y_f^2) \geq 5$. Using this margin between $x_f^2$, $y_f^2$ in Equation 5, $t_s \leq 31.6 \times t_{on}$ is obtained. Thus, the largest $t_s$ that can be used is upper bounded by the lowest values of $t_{on}$. The lowest value of $t_{on}$, among all radar types, is 0.5 μs. Hence, $t_s \leq 15.8$ μs. However, while performing evaluations it was observed that although selecting $t_s \leq 15.8$ μs ensures high detection accuracy, $t_s = 4.096$ μs must be used to achieve the target detection rate of 99%. Hence, the method uses $t_s = 4.096$ μs, which implies $M = S \times t_s = 512$, in DeepRadar.

While $t_s$ 418 defines the width of the spectrograms, $t_o$ 416 defines their height. For selecting a suitable to, first note that a pulse burst must be detected within 5 seconds. Hence, $t_o \geq 5$ seconds. However, since a radar pulse burst can be as small as 0.6 ms, using $t_o \approx 5$ seconds may cause the duration of a short burst to be significantly smaller than to, leading to significant non-radar information in an observation window. Select $t_o$(416) to be the maximum of the minimum burst length across all radar types, i.e., $t_o = 13$ ms. This ensures that the shortest bursts do not span multiple observation windows causing insufficient radar information in a single window.

3. Adaptive computing (420): If the computing resources on the ESC 336 are limited, DeepRadar 400 may not be able to process 402 the (I, Q) 403 samples, i.e., compute the PSDs (at 424) and pass (at 428) the spectrograms 435 through the CNN 433, and keep up with RF sampling 402. In such cases, the ESC 336 encounters memory overflows, which may lead to temporary sensing blindness and inferior detection accuracy. To address this issue, it can be first observed that even though $t_o$ is chosen to be as low as 13 ms there is still enough sparsity of radar information in the spectrograms. This observation is exploited to develop a strategy that enables DeepRadar 400 to adapt its computations based on the available computing resources on an ESC. As discussed in the previous section, a value of $t_s = 4.096$ μs is used for SIL to be highly accurate. Thus, N (spectrograms' height) is $$\frac{t_o}{t_s} = 13 \text{ ms}/4.096 \text{ μs} \approx 3200.$$

The adaptive strategy 420 in DeepRadar, which may be called skip, avoids computing PSDs for some carefully chosen time slots/rows, based on the available computing resources, among the 3200 rows in a spectrogram. Reducing the number of PSD computations enables timely predictions by SIL without any memory overflow. Refer to 421, or use the skip technique to select T out of N time slots.

Skip: Skip is based on the observation that time slots with relatively higher energy have a higher possibility of containing radar pulses, as long as $t_s = 4.096$ μs. Hence, the first step in skip is to compute the energy of the N time slots in an observation window and form the energy sequence $e_i$. Next, sort $e_i$ and determine the time slots that correspond to the highest T (less than N) values in $e_i$, as also shown in FIG. 4, item 421. Finally, at 424, compute the PSDs for the determined T time slots, and the resulting spectrogram is of size T×M.

Reducing the number of PSD computations ensures faster predictions. However, since the PSDs are computed only after computing the energy sequence, $e_i$, in some scenarios, computing $e_i$ can be the bottleneck in timely predictions. To address this issue, every Kth (K≥1) (I, Q) sample in a time slot is used, with K=1 implying no sample is skipped, while computing the energy of a time slot. This strategy is based on the observation that skipping samples within the time slots reduces the energy of both radar and interference signals; however, their relative energy difference would still be maintained, as long as some of the (I,Q) tuples corresponding to the radar pulses' ON time are retained. Hence, K is selected such that a radar pulse is never totally skipped. Since the narrowest radar pulse is 0.5 μs it follows that K×(1/S)<0.5 μs, i.e. K<62. Here, 1/S is the inter-sample duration.

The upper bound on K is based on determining how many samples it is possible to skip without missing a full radar pulse. The higher K is, the lower is the time required for energy computation. However, if a high value of K is selected, then the radar detection accuracy may drop below 99%. So, the lower value of K is bounded by radar detection accuracy.

In summary, skip 421 helps avoid computing PSDs for unimportant time slots, controlled by T. The samples in a time slot are not skipped while computing a PSD. To determine which time slots are essential, compute the energy of the time slots. To reduce this computing time, skip samples within time slots, controlled by K.

Selecting K and T: When running DeepRadar on a particular hardware, the method can first probe whether the application can run smoothly without skip, i.e., with K=1 and T=N (actually T=50, as explained in next section). If the predictions are not timely, gradually increase K and reduce T until the predictions are timely, ensuring no memory overflow while running DeepRadar continuously. The probing is performed before the training phase because the radar objects have different patterns for different values of T, and SIL should be trained with patterns similar to those that must be detected in the online phase.

Skip may require different hardware to run with a different value of T, making the shape of the input spectrograms in SIL hardware dependent. As the shape of input spectrograms changes, SIL's hyperparameters are re-adjusted, which can be a hindrance towards DeepRadar deployment. A strategy is described in the next section, although with a different motivation, that avoids this problem.

4. Radar bandwidth estimation (430): The object detection of SIL 422 has the in-built capability of estimating the bandwidth of the radar signals. However, the constraint of using M=512 has an implication on the accuracy of bandwidth estimation. Using M=512 causes the number of spectrogram rows containing radar information to be sparse. Detecting a radar object is easier if the density of the bright spots in the spectrogram is high. Thus, in this section, a modification is made in SIL to address this sparsity problem.

The strategy is to remove some non-radar rows from the spectrograms to increase the density of the bright spots. While this can be done by computing the whole spectrogram and then retaining rows with high pixel values indicating the possible presence of radar pulses, a more computationally elegant way is to avoid computing the PSDs for the non-radar rows using skip. Hence, skip is always used with T=50 even when the ESC 336 has ample compute resources. When the computing resources on the ESC 336 are scarce, and T<50 is used, the T (<50) computed PSDs are randomly replicated to create a spectrogram with 50 rows. Thus, the input spectrograms in SIL are always of size 50×512, which also addresses the hardware dependence described in the previous section, namely 3. adaptive computing (420).

When computing resources are ample, the reason for choosing T=50 stems from the radar parameters. The bandwidth of radar pulses is the same for all the pulses within a pulse burst. Thus, at least one complete pulse in the spectrogram must be retained to ensure that the spectrogram contains all the relevant radar frequencies for accurate bandwidth estimation. Now, the widest pulse, across all radar types, is 100 ρs for radar type 5, spanning almost 25 consecutive time slots, each of duration 4.096 μs. Thus, T≥25. Using exactly T=25 can increase the bandwidth estimation 432 error due to the following reason. If the energy is the same for all the time slots that a radar pulse spans, then with T=25, the sorting in skip retains one or more complete pulses in the spectrogram, rather than parts of different pulses in an observation window. However, in situations where the above condition is not true, e.g., in the presence of fading, the sorting in skip, with T=25, may retain parts of different radar pulses, possibly leading to incomplete radar bandwidth information in the spectrograms. Thus, add some redundancy and use T=50 so that even from parts of different pulses, there is a good chance of retaining all the radar frequencies in the spectrograms.

OoB radar detection: The bandwidth estimation capability of SIL is used to distinguish in-band from OoB radar signals (434). DeepRadar is run with a monitoring band of 125 MHz (3537.5-3662.5 MHz), 25 MHz more than the 100 MHz band used by radars operating in the CBRS band. When DeepRadar detects any radar signal in this 125 MHz band and estimates its spectral occupancy, it also checks if the majority of the detected radar signal is outside the band used by radars in the CBRS band, 3550-3650 MHz. If so, DeepRadar does not mark the detected radar as an in-band radar signal. For this strategy to work, SIL should be able to detect radar signals outside the CBRS band. Hence, instances of OoB radar signals are included in the training data. From SIL's view-point, there is no difference between in-band and OoB radar signals, except for one factor. The bandwidth of the OoB radar signals used in training must be adjusted based on the portion of radar spectrum present in the 125 MHz monitoring band. E.g., if there is a 50 MHz type 3 OoB radar, centered at 3525 MHz, there is only 12.5 MHz of its spectrum in the 125 MHz monitoring band. Thus, 12.5 MHz is used as this radar signal's bandwidth in SIL training.

5. Countering interference: DeepRadar must deal with any aggregate CBSD interference at the ESC 336, whose statistical characteristics are unknown, although the SAS 328 ensures that the maximum interference is bounded. One way to tackle this uncertainty is to use AWGN as a proxy for aggregated CBSD interference. The rationale behind this strategy is that the statistical characteristics of off-tuned signals from LTE eNodeBs (eNB), operating in time division duplexing (TDD) mode resemble that of AWGN. Since the CBSDs are expected to operate as LTE eNodeBs in TDD mode, the aggregate interference at the ESC is a sum of multiple independent AWGN, which, in turn, is also AWGN. Thus, AWGN is used, with and without radar signals in the training data. The AWGN is at maximum possible interference power level at the ESC, and the radar signals at 20 dB peak-to-average SIR, per MHz. Training DeepRadar in this way is strategically robust because the peak-to-average SIR, per MHz, at a field-deployed ESC cannot be less than 20 dB, and similar signals are expected in the ESC certification test, where the AWGN interference is consistently applied. However, the interference pattern at a field-deployed ESC may be quite different due to the following two reasons. The aggregate interference may change within the observation windows because LTE frames are of 10 ms, which is less than the observation windows (13 ms), and different LTE eNBs may have different uplink/downlink (UL/DL) configurations. Furthermore, the LTE signals' spectral characteristics may produce objects in the spectrograms that resemble radar objects. Consequently, the online spectrograms in the field may have background (non-radar) patterns that are much different from those in the training images. This inconsistency between train and test data may result in misclassifications.

Using some recorded LTE signals in the training data would not solve the above problem because the interference in the field may have patterns very different from the LTE data used in training. Thus, a data augmentation approach is used to bolster the learning in SIL. In the training data, two types of interference data are incorporated, generated artificially as described next, that encompass all LTE interference scenarios that an ESC may encounter in the field. It is assumed that the interference at an ESC 336 is mainly from the LTE eNBs (344, 346, 348), not from the user equipment 110, and pay attention only to the DL slots of LTE TDD UL/DL configurations.

Random LTE interference: The aggregate LTE interference may have different spectral occupancy for different spectrogram rows, leading to random background patterns in the spectrograms. This can happen because T out of N time slots are selected in an observation window 411. If the chosen T time slots are not consecutive, temporal parts of different LTE downlink transmissions may be captured in the spectrograms. Recording signals that would produce a variety of random LTE interference is difficult in practice. Therefore, to create spectrograms with random LTE interference, the method artificially constructs interference PSDs. For this purpose, first, the method captures LTE signals with 2-3 non-overlapping downlink transmissions, each 10 MHz wide, at known frequencies. Then, the method uses the 10 MHz wide LTE portions from the captured signals' PSDs and replicates those portions on some of the CBSD channels, chosen randomly, to construct a large set of new PSDs. The CBSD channels are ten contiguous non-overlapping channels, each 10 MHz wide, spanning the 100 MHz radar monitoring band. Thus, each of the constructed PSDs contains several simultaneous LTE downlink signals, chosen randomly in the range 1-10. The method ensures that the constructed PSDs have the same noise floor as the rest of the training data, and the aggregate interference power never exceeds the maximum possible interference at the ESC 336. Finally, for creating a spectrogram corresponding to random LTE interference, randomly select T PSDs, from the set of artificially constructed PSDs, and stack them up.

Non-random LTE interference: In contrast to the above case, it is possible that several consecutive time slots are chosen among T time slots in an observation window. In such cases, the spectral patterns of the aggregate LTE interference can be the same across multiple rows in a spectrogram, because the time slots are of 4.096 ρs long and the LTE DL slots are in the range of 1-7 ms. For creating spectrograms with non-random LTE interference, use the same approach described for random LTE interference, but keep the spectral occupancy of the LTE interference unchanged for a few consecutive time slots that are chosen randomly. Using the above methods, spectrograms are generated, both with and without radar objects, and use them in training.

Figure 6:
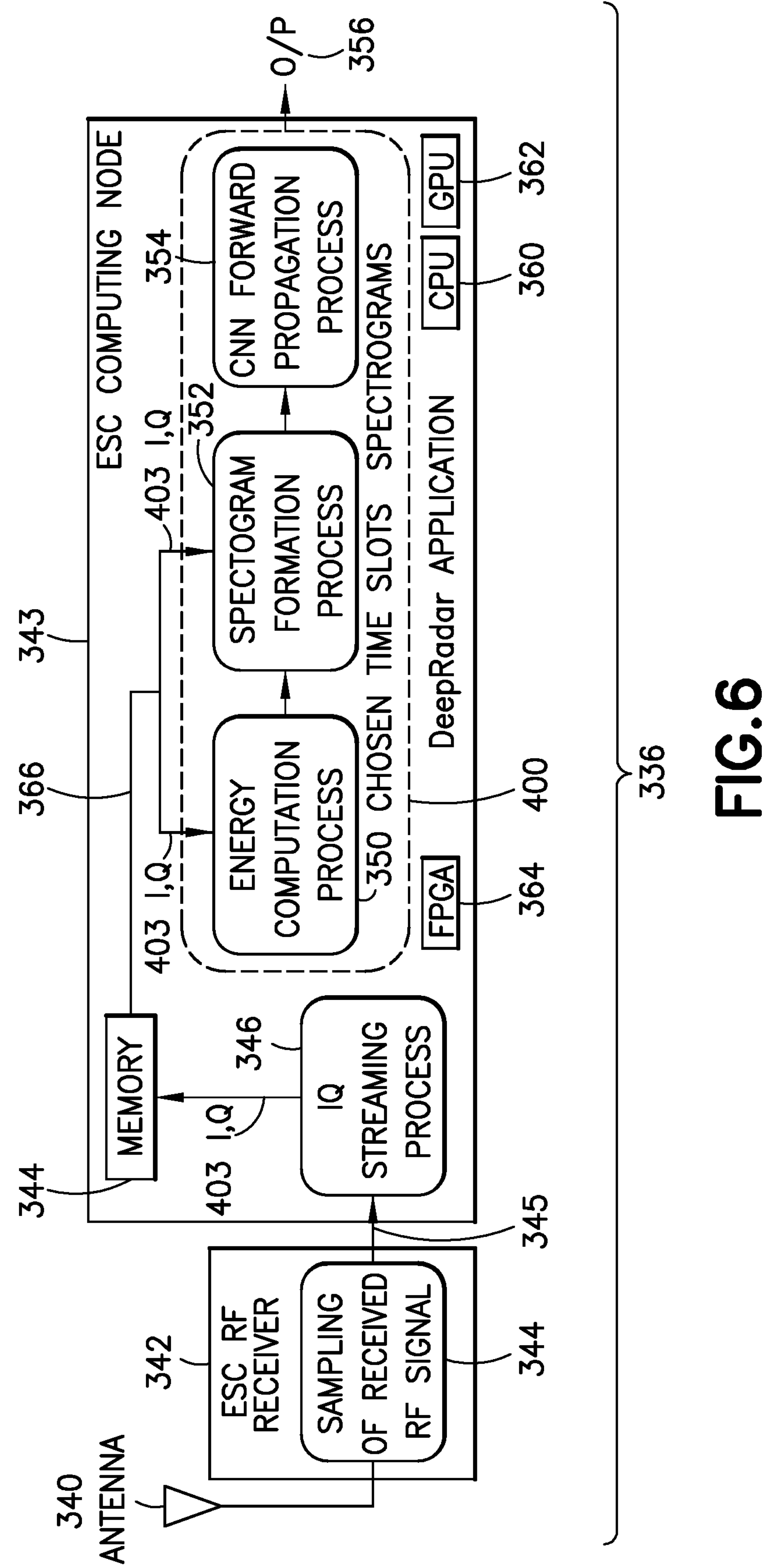
FIG. 6 illustrates process level parallelization of the described deep radar method.

6.6. Implementation of DeepRadar: With reference to FIG. 6, DeepRadar requires two components, an RF receiver 342 and a compute node 343, whose requirements are outlined next.

ESC RF receiver (342): There are three essential requirements on the RF receiver 342: i) instantaneous bandwidth≥100 MHz, ii) capability of operation in the 3.5 GHz band, and iii) high speed transfer of the (I,Q) samples to the compute node 343. Based on these requirements, after analyzing the suitability of different COTS SDRs it was determined that an AIR-T SDR qualifies as an ESC RF receiver.

As further shown in FIG. 6, the ESC RF receiver 342 comprises an antenna 340. The ESC RF receiver 342, at 344, performs sampling of the received RF signal.

ESC computing node (343): DeepRadar is designed as a four process pipeline (346, 350, 352, 354) as shown in FIG. 6. The first requirement is to have at least four cores, so that all four processes can progress in parallel. The streaming process 346 must keep up with the high data transfer rate from the RF receiver 342. Thus, the second requirement is to have an interface 345 that can seamlessly offload the traffic from the receiver.

All three processes in DeepRadar application 400 must complete processing an observation window (of duration $t_o$=13 ms) within 13 ms, so that the (I, Q) samples are cleared from memory 344 at the same rate they are populated by the streaming process 346. DeepRadar 400 must ensure the timeliness of its processes by strategically allocating the computing resources on the ESC 336 to its processes. This allocation is done in the probing phase, which is conducted before training. In the probing phase, DeepRadar 400 monitors the average processing time of an observation window for all three processes (processes 350, 352, 354). If any of them takes more than 13 ms for its computation, DeepRadar speeds it up using sub-processes if additional cores are available. Employing sub-processes is meaningful only if extra cores are available, so that the sub-processes can parallelize the computations. E.g., the energy computation 350 and spectrogram formation 352 processes benefit from sub-processes by computing in parallel different parts of the energy sequence, $e_i$, and different rows of a spectrogram. The CNN process 354 cannot be parallelized, but multiple sub-processes can load-balance the input spectrograms. The CNN process 354 can also benefit from the availability of a GPU on the ESC 336. If the energy computation 350 or spectrogram formation 352 still cannot be done in 13 ms, even after exhausting all available cores, then DeepRadar 400 uses the skip technique (421, FIG. 4) and gradually increases K (for energy computation process 350) and/or reduces T (for spectrogram formation process 352) until they can be done in 13 ms. The output of the DeepRadar application 400 comprises O/P 356.

Presented next is an embedded system-based implementation of DeepRadar 400 using an AIR-T sensor that meets the ESC hardware requirements discussed above.

AIR-T based implementation: The AIR-T eliminates any cabling between the RF receiver 342 and the compute node 343 by placing an RF transceiver 342 and the compute node 343 on the same circuit board. The on-board FPGA 364 transfers the captured (I, Q) samples over a high speed PCIe interface 345 to the on-board memory 344 (8 GB) that is shared by both the CPU 360 and GPU 362 in the compute node 343. In one example, the compute node 343 is an embedded computing device, with a 256 core GPU, and 6 CPU cores.

The advantage of the compute node's edge computing comes at the cost of reduced compute resources on the ESC 336. The probing phase reveals that none of the processes (350, 352, 354) in the DeepRadar 400 pipeline can process an observation window in 13 ms. First, an idea is to speed up the energy computation using two sub-processes, but still it cannot be done in 13 ms. With no more spare cores (five for DeepRadar and one for maintaining a socket connection with the SAS 328 and other housekeeping tasks), employ the skip technique (421) and increase K. With K=4 the energy computation can be done in 13 ms, however it hampers the radar detection accuracy. For 99% radar detection accuracy use K≤2. Thus, to be able to use K=2, compute |I|+|Q|, instead of $I^2+Q^2$, as a proxy energy to reduce the energy computation time. Next, the method tackles the CNN process 354, which cannot be completed in 13 ms even after using the compute node GPU 362. To deal with this, the method uses a TensorRT inference accelerator (i.e. NVIDIA® TensorRT™). The TensorRT inference accelerator reduces the processing time of the CNN process 354, but still it is not within 13 ms. Thus, the method implements/uses two cores to load-balance the CNN process 354. However, with no spare core, a modification is made to the DeepRadar pipeline. The spectrogram formation 352 and CNN forward pass 354 are combined in a single process, where these two operations are performed serially, and use two load-balancing sub-processes that perform CNN computation on every alternate observation window. To ensure that each of the load-balancing processes' computation can be done in 13×2=26 ms, because of processing alternate windows, use T=8 for the spectrogram formation 352.

Figure 7:
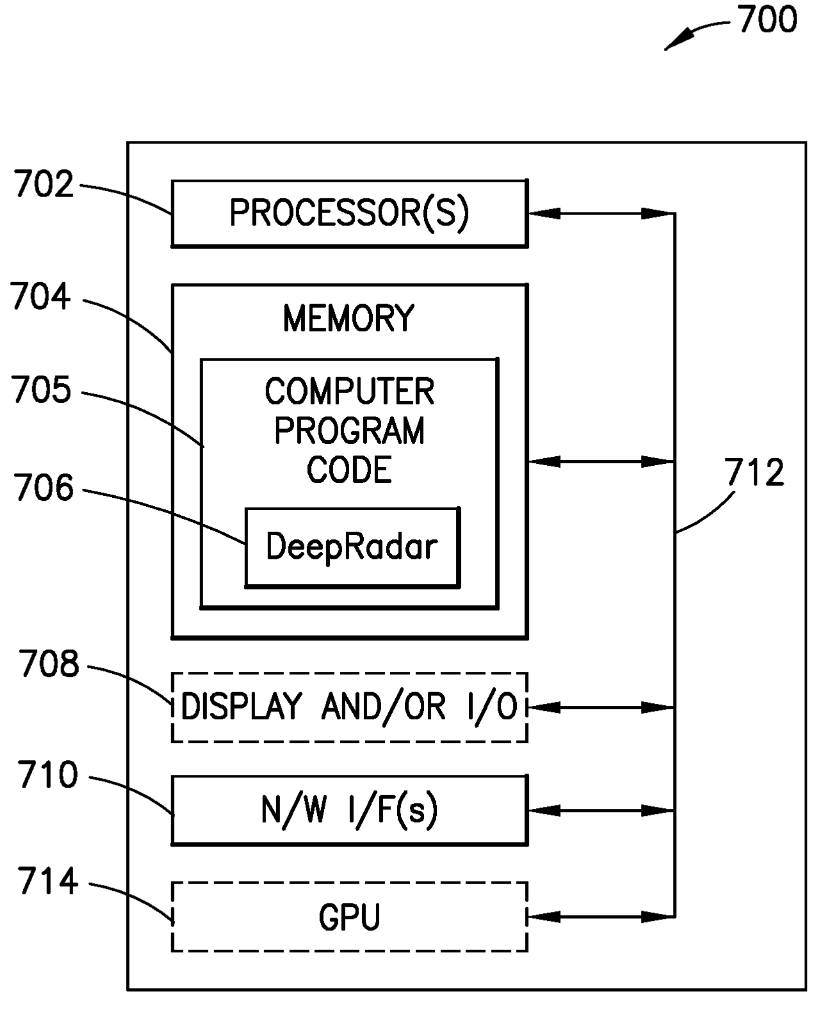
FIG. 7 is an example apparatus configured to implement a deep-learning-based environmental sensing capability sensor design for the 3.5 GHz CBRS band, based on the examples described herein.

FIG. 7 is an example apparatus 700, which may be implemented in hardware, configured to implement the examples described herein. The apparatus 700 comprises at least one processor 702 (an FPGA and/or CPU), at least one non-transitory or transitory memory 704 including computer program code 705, wherein the at least one memory 704 and the computer program code 705 are configured to, with the at least one processor 702, cause the apparatus 700 to implement circuitry, a process, component, module, or function (collectively DeepRadar 706) to implement a deep-learning-based environmental sensing capability sensor design for the 3.5 GHz CBRS band.

The apparatus 700 optionally includes a display and/or I/O interface 708 that may be used to display aspects or a status of the methods described herein (e.g., as one of the methods is being performed or at a subsequent time). The apparatus 700 includes one or more network (N/W) interfaces (I/F(s)) 710. The N/W I/F(s) 710 may be wired and/or wireless and communicate over the Internet/other network(s) via any communication technique. The N/W I/F(s) 710 may comprise one or more transmitters and one or more receivers. The N/W I/F(s) 710 may comprise standard well-known components such as an amplifier, filter, frequency-converter, (de)modulator, and encoder/decoder circuitries and one or more antennas. The apparatus 700 may also include GPU 714.

The apparatus 700 to implement the functionality of DeepRadar 706 may be UE 110, RAN node 170, or network element(s) 190. Thus, processor 702 may correspond respectively to processor(s) 120, processor(s) 152 and/or processor(s) 175, memory 704 may correspond respectively to memory(ies) 125, memory(ies) 155 and/or memory(ies) 171, computer program code 705 may correspond respectively to computer program code 123, module 140-1, module 140-2, and/or computer program code 153, module 150-1, module 150-2, and/or computer program code 173, and N/W I/F(s) 710 may correspond respectively to N/W I/F(s) 161 and/or N/W I/F(s) 180. Alternatively, apparatus 700 may not correspond to either of UE 110, RAN node 170, network element(s) 190, as apparatus 700 may correspond to ESC 336, or be part of a self-organizing/optimizing network (SON) node, such as in a cloud. The apparatus 700 may also be distributed throughout the network 100 including within and between apparatus 700 and any one of the network element(s) (190) (such as a network control element (NCE)) and/or the RAN node 170 and/or the UE 110.

When apparatus 700 corresponds to ESC 336, N/W I/F(s) 710 correspond to ESC RF receiver 342, memory 704 corresponds to memory 344, and DeepRadar 706 corresponds to IQ streaming process 346 and DeepRadar 400 that includes energy computation process 350, spectrogram formation process 352, and CNN forward propagation process 354. Further, processor(s) 702 may correspond to CPU 360 and/or FPGA 364, GPU 714 may correspond to GPU 362, and interface 712 may correspond to interface 345 and/or 366. Further, display and/or I/O 708 may correspond to O/P 356.

Interface 712 enables data communication between the various items of apparatus 700, as shown in FIG. 7. For example, the interface 712 may be one or more buses such as address, data, or control buses, and may include any interconnection mechanism, such as a series of lines on a motherboard or integrated circuit, fiber optics or other optical communication equipment, and the like. Computer program code 705, including DeepRadar 706 may comprise object-oriented software configured to pass data/messages between objects within computer program code 705. The apparatus 700 need not comprise each of the features mentioned and shown in FIG. 7, or may comprise other features as well.

Figure 8:
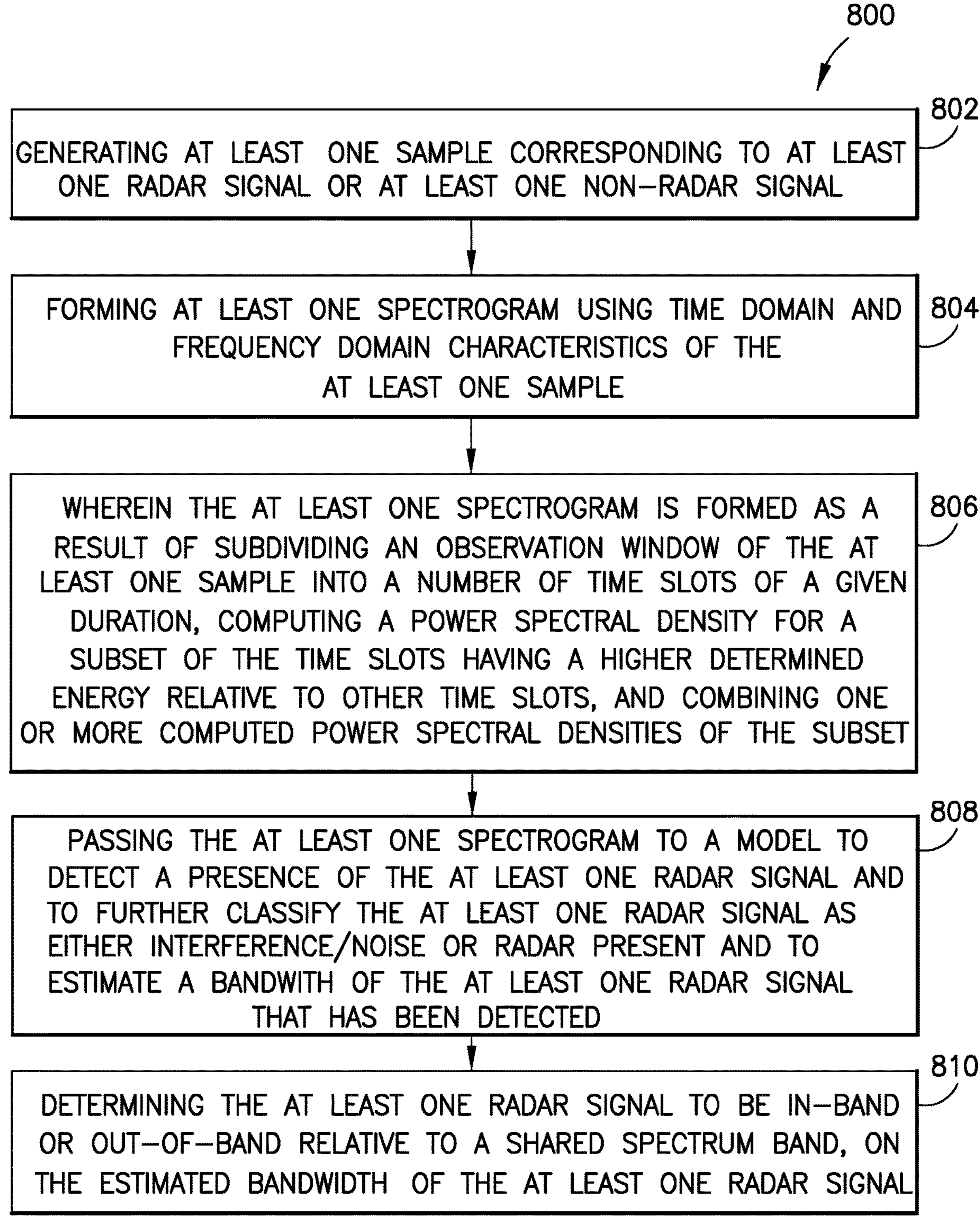
FIG. 8 is a method to implement a deep-learning-based environmental sensing capability sensor design for the 3.5 GHz CBRS band, based on the examples described herein.

FIG. 8 is an example method 800 to implement a deep-learning-based environmental sensing capability sensor design for the 3.5 GHz CBRS band, based on the example embodiments described herein. At 802, the method includes generating at least one sample corresponding to at least one radar signal or at least one non-radar signal. At 804, the method includes forming at least one spectrogram using time domain and frequency domain characteristics of the at least one sample. At 806, the method includes wherein the at least one spectrogram is formed as a result of subdividing an observation window of the at least one sample into a number of time slots of a given duration, computing a power spectral density for a subset of the time slots having a higher determined energy relative to other time slots, and combining one or more computed power spectral densities of the subset. At 808, the method includes passing the at least one spectrogram to a model to detect a presence of the at least one radar signal and to further classify the at least one radar signal as either interference/noise or radar present, and to estimate a bandwidth of the at least one radar signal that has been detected. At 810, the method includes determining the at least one radar signal to be in-band or out-of-band relative to a shared spectrum band, based on the estimated bandwidth of the at least one radar signal. Method 800 may be performed with ESC 336, apparatus 700, spectrum controller cloud 302, network element(s) 190, or a combination of those.

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memory(ies) as described herein may be implemented using any suitable data storage technology, such as semiconductor based memory devices, flash memory, magnetic memory devices and systems, optical memory devices and systems, non-transitory memory, transitory memory, fixed memory and removable memory. The memory(ies) may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

According to a first example aspect, there is provided an apparatus comprising at least one processor; and at least one memory including computer program code; the at least one memory and the computer program code configured to, with the at least one processor, cause the apparatus at least to perform: generate at least one sample corresponding to at least one radar signal or at least one non-radar signal; form at least one spectrogram using time domain and frequency domain characteristics of the at least one sample; wherein the at least one spectrogram is formed as a result of subdividing an observation window of the at least one sample into a number of time slots of a given duration, computing a power spectral density for a subset of the time slots having a higher determined energy relative to other time slots, and combining one or more computed power spectral densities of the subset; pass the at least one spectrogram to a model to detect a presence of the at least one radar signal and to further classify the at least one radar signal as either interference/noise or radar present, and to estimate a bandwidth of the at least one radar signal that has been detected; and determine the at least one radar signal to be in-band or out-of-band relative to a shared spectrum band, based on the estimated bandwidth of the at least one radar signal.

According to an example embodiment, the apparatus is further caused to perform: determine the at least one radar signal to be out-of-band in response to the estimated bandwidth being outside of the shared spectrum band.

According to an example embodiment, the shared spectrum band is 3100 megahertz to 3400 megahertz, 3450 megahertz to 3550 megahertz, or 3550 megahertz to 3650 megahertz.

According to an example embodiment, the apparatus is further caused to perform: estimate, using the model, the bandwidth of the at least one radar signal as a result of detecting bright spots within the at least one spectrogram, the bright spots comprising spectral components that have higher power relative to other spectral components within the computed one or more power spectral densities for the subset of the time slots.

According to an example embodiment, the apparatus is further caused to perform: compute the one or more power spectral densities for the time slots to determine the at least one spectrogram; and remove rows from the at least one spectrogram corresponding to the time slots having relatively lower pixel values that do not indicate the presence of radar pulses, to remove non-radar rows from the at least one spectrogram to increase the density of the bright spots.

According to an example embodiment, the apparatus is further caused to perform: detect the at least one radar signal exceeding a threshold value of peak-to-average signal-to-interference, per megahertz; and apply an upper bound to the given duration of the time slots so that the average-to-average signal-to-interference is above a threshold, the given duration defining a width of the at least one spectrogram.

According to an example embodiment, the upper bound is a lowest value of an on duration of the at least one radar signal.

According to an example embodiment, the upper bound is chosen so that there is at least one bright spot in the at least one spectrogram, the at least one bright spot comprising spectral components that have higher power relative to other spectral components within a computed power spectral density.

According to an example embodiment, the threshold value of peak-to-average signal-to-interference, per megahertz, is 20 decibels.

According to an example embodiment, the upper bound to the given duration of the time slots is applied using Parseval's theorem.

According to an example embodiment, the at least one sample is a tuple comprising an in-phase value corresponding to the at least one radar signal, and a quadrature value corresponding to the at least one radar signal; and the power spectral density for a time slot is computed with the apparatus using a plurality of the tuples within the time slot, the power spectral density representing an average power at different spectral components of the at least one radar signal.

According to an example embodiment, the at least one spectrogram is a matrix having a first dimension corresponding to the number of time slots of the given duration, and a second dimension corresponding to a number of frequency bins of the power spectral density; and the at least one spectrogram is an image whose pixel values represent signal power across different frequency bins and the time slots.

According to an example embodiment, the number of frequency bins corresponds to a number of in-phase and quadrature values in the time slot.

According to an example embodiment, the spectrogram is a two-dimensional image with frequency along a width of the image, and with time along a height of the image.

According to an example embodiment, the apparatus is further caused to perform: constrain the width of the spectrogram based on a certification requirement of an environmental sensing capability node of the apparatus.

According to an example embodiment, the apparatus is further caused to perform: skip computing the power spectral density for time slots not in the subset having the relatively higher computed energy; where a number of time slots in the subset is less than the number of time slots.

According to an example embodiment, a number of slots in the subset is equal to the number of time slots, such that no time slots are skipped when computing the one or more power spectral densities for the at least one spectrogram.

According to an example embodiment, the apparatus is further caused to perform: compute the energy of a time slot using sample increments given with an integer, the integer being greater than or equal to one, where no sample is skipped when the integer is equal to one; and select a lower bound for the integer so that the energy computation occurs within a time threshold.

According to an example embodiment, the apparatus is further caused to perform: select an upper bound for the integer such that detecting the presence of the at least one radar signal exceeds a radar detection threshold.

According to an example embodiment, the apparatus is further caused to perform: determine a value for the integer and a number of slots in the subset as a result of gradually increasing the integer and reducing the number of slots in the subset until the detection of the presence of the at least one radar signal and its bandwidth estimation is within a time threshold, and until there is no memory overflow such that samples are cleared from the memory at the same rate they are placed into the memory following the generation of the at least one sample.

According to an example embodiment, the apparatus is further caused to perform: train the model via determining how a non-deterministic aggregation of radio signals at an environmental sensing capability node of the apparatus affects the at least one spectrogram during spectrogram image learning.

According to an example embodiment, the apparatus is further caused to perform: train the model using instances of out-of-band radar signals; and adjust the instances of the out-of-band radar signals used to train the model based on a portion of radar spectrum present in a monitoring band of a radio frequency receiver of the apparatus.

According to an example embodiment, the model is a convolutional neural network, a regression model, and/or a you only look once model.

According to an example embodiment, the apparatus is further caused to perform: monitor a band centered at a center frequency of the shared spectrum band, the monitored band being wider than the shared spectrum band; determine whether a majority of an estimated bandwidth of the at least one radar signal is outside the shared spectrum band; and determine the at least one radar signal to be out-of-band radar in response the majority of the estimated bandwidth of the at least one radar signal being outside the shared spectrum band.

According to an example embodiment, the monitored band is 125 megahertz corresponding to a bandwidth of 3537.5 megahertz to 3662.5 megahertz, 25 megahertz wider than the shared spectrum band, the shared spectrum band having a bandwidth of 3550 megahertz to 3650 megahertz.

According to an example embodiment, the shared spectrum band is a citizens broadband radio service band.

According to an example embodiment, the apparatus is further caused to perform: select a height of the at least one spectrogram as a maximum of a minimum burst length across a set of types of the at least one radar signal.

According to an example embodiment, the apparatus is further caused to perform: determine an aggregate interference of a plurality of wireless devices for an environmental sensing capability node of the apparatus; determine the aggregate interference as a sum of a respective additive white Gaussian noise corresponding to the respective wireless devices, such that the additive white Gaussian noise is a proxy for the aggregated interference of the wireless devices; and train the model using the determined aggregate interference.

According to an example embodiment, the wireless devices are operating in the shared spectrum band.

According to an example embodiment, the wireless devices are citizens broadband radio service devices.

According to an example embodiment, the apparatus is further caused to perform: train the model using a constructed spectrogram corresponding to random interference, the constructed spectrogram having been created as a result of randomly selecting a number of artificially constructed power spectral densities that have been stacked; or train the model using a constructed spectrogram corresponding to non-random interference, the constructed spectrogram having been created as a result of randomly selecting a number of artificially constructed power spectral densities that have been stacked while keeping a spectral occupancy of interference unchanged for a number of randomly chosen consecutive time slots; and wherein the artificially constructed power spectral densities have a size corresponding to radar signals captured from at least one wireless device.

According to an example embodiment, the apparatus is further caused to perform: train the model using a set of lower and higher frequencies of a plurality of radar signals.

According to an example embodiment, the apparatus further comprises an environmental sensing capability receiver that detects the presence of the at least one radar signal and generates the at least one sample corresponding to the at least one radar signal, wherein the environmental sensing capability receiver is an artificial intelligence radio transceiver software-defined radio environmental sensing capability radio frequency receiver.

According to an example embodiment, the apparatus further comprises multiple processor cores used to execute parallel processing such that the generating of the at least one sample, the energy determination, and the spectrogram formation are executed in parallel.

According to an example embodiment, the apparatus is further caused to perform: monitor an amount of time it takes to process the energy determination, the spectrogram formation, and the bandwidth estimation during a probing phase prior to training the model; and in response to the energy determination, the spectrogram formation, or the bandwidth estimation taking longer than a duration of the observation window, use an additional processor core to speed up the process that takes longer than the observation window.

According to an example embodiment, the energy determination, the spectrogram formation, and/or the bandwidth estimation occur in parallel with the detecting of the presence of the at least one radar signal.

According to an example embodiment, the at least one radar signal is generated from a movable source.

According to an example embodiment, the apparatus may be included within a spectrum controller cloud.

According to an example embodiment, the apparatus may be implemented as an environmental sensing capability node within the spectrum controller cloud.

According to an example embodiment, the shared spectrum band provides access to at least one of incumbent users, priority access license users or general authorized access users.

According to an example embodiment, the apparatus may further include circuitry configured to transfer the at least one sample to the memory that is shared with the at least one processor and optionally a graphics processing unit of a compute node of the apparatus, the compute node used for the energy determination, the spectrogram formation, and the bandwidth estimation, wherein the circuitry is discrete circuitry, a field programmable gate array, or an application-specific integrated circuit.

According to a second example aspect, there is provided an apparatus comprising means for performing: generating at least one sample corresponding to at least one radar signal or at least one non-radar signal; forming at least one spectrogram using time domain and frequency domain characteristics of the at least one sample; wherein the at least one spectrogram is formed as a result of subdividing an observation window of the at least one sample into a number of time slots of a given duration, computing a power spectral density for a subset of the time slots having a higher determined energy relative to other time slots, and combining one or more computed power spectral densities of the subset; passing the at least one spectrogram to a model to detect a presence of the at least one radar signal and to further classify the at least one radar signal as either interference/noise or radar present, and to estimate a bandwidth of the at least one radar signal that has been detected; and determining the at least one radar signal to be in-band or out-of-band relative to a shared spectrum band, based on the estimated bandwidth of the at least one radar signal.

According to an example embodiment, the means are further configured to perform: determining the at least one radar signal to be out-of-band in response to the estimated bandwidth being outside of the shared spectrum band.

According to an example embodiment, the shared spectrum band is 3100 megahertz to 3400 megahertz, 3450 megahertz to 3550 megahertz, or 3550 megahertz to 3650 megahertz.

According to an example embodiment, the means are further configured to perform: estimating, using the model, the bandwidth of the at least one radar signal as a result of detecting bright spots within the at least one spectrogram, the bright spots comprising spectral components that have higher power relative to other spectral components within the computed one or more power spectral densities for the subset of the time slots.

According to an example embodiment, the means are further configured to perform: computing the one or more power spectral densities for the time slots to determine the at least one spectrogram; and removing rows from the at least one spectrogram corresponding to the time slots having relatively lower pixel values that do not indicate the presence of radar pulses, to remove non-radar rows from the at least one spectrogram to increase the density of the bright spots.

According to an example embodiment, the means are further configured to perform: detecting the at least one radar signal exceeding a threshold value of peak-to-average signal-to-interference, per megahertz; and applying an upper bound to the given duration of the time slots so that the average-to-average signal-to-interference is above a threshold, the given duration defining a width of the at least one spectrogram.

According to an example embodiment, the upper bound is a lowest value of an on duration of the at least one radar signal.

According to an example embodiment, the upper bound is chosen so that there is at least one bright spot in the at least one spectrogram, the at least one bright spot comprising spectral components that have higher power relative to other spectral components within a computed power spectral density.

According to an example embodiment, the threshold value of peak-to-average signal-to-interference, per megahertz, is 20 decibels.

According to an example embodiment, the upper bound to the given duration of the time slots is applied using Parseval's theorem.

According to an example embodiment, the at least one sample is a tuple comprising an in-phase value corresponding to the at least one radar signal, and a quadrature value corresponding to the at least one radar signal; and the power spectral density for a time slot is computed with the apparatus using a plurality of the tuples within the time slot, the power spectral density representing an average power at different spectral components of the at least one radar signal.

According to an example embodiment, the at least one spectrogram is a matrix having a first dimension corresponding to the number of time slots of the given duration, and a second dimension corresponding to a number of frequency bins of the power spectral density; and the at least one spectrogram is an image whose pixel values represent signal power across different frequency bins and the time slots.

According to an example embodiment, the number of frequency bins corresponds to a number of in-phase and quadrature values in the time slot.

According to an example embodiment, the spectrogram is a two-dimensional image with frequency along a width of the image, and with time along a height of the image.

According to an example embodiment, the means are further configured to perform: constraining the width of the spectrogram based on a certification requirement of an environmental sensing capability node of the apparatus.

According to an example embodiment, the means are further configured to perform: skipping computing the power spectral density for time slots not in the subset having the relatively higher computed energy; where a number of time slots in the subset is less than the number of time slots.

According to an example embodiment, a number of slots in the subset is equal to the number of time slots, such that no time slots are skipped when computing the one or more power spectral densities for the at least one spectrogram.

According to an example embodiment, the means are further configured to perform: computing the energy of a time slot using sample increments given with an integer, the integer being greater than or equal to one, where no sample is skipped when the integer is equal to one; and selecting a lower bound for the integer so that the energy computation occurs within a time threshold.

According to an example embodiment, the means are further configured to perform: selecting an upper bound for the integer such that detecting the presence of the at least one radar signal exceeds a radar detection threshold.

According to an example embodiment, the means are further configured to perform: determining a value for the integer and a number of slots in the subset as a result of gradually increasing the integer and reducing the number of slots in the subset until the detection of the presence of the at least one radar signal and its bandwidth estimation is within a time threshold, and until there is no memory overflow such that samples are cleared from the memory at the same rate they are placed into the memory following the generation of the at least one sample.

According to an example embodiment, the means are further configured to perform: training the model via determining how a non-deterministic aggregation of radio signals at an environmental sensing capability node of the apparatus affects the at least one spectrogram during spectrogram image learning.

According to an example embodiment, the means are further configured to perform: training the model using instances of out-of-band radar signals; and adjusting the instances of the out-of-band radar signals used to train the model based on a portion of radar spectrum present in a monitoring band of a radio frequency receiver of the apparatus.

According to an example embodiment, the model is a convolutional neural network, a regression model, and/or a you only look once model.

According to an example embodiment, the means are further configured to perform: monitoring a band centered at a center frequency of the shared spectrum band, the monitored band being wider than the shared spectrum band; determining whether a majority of an estimated bandwidth of the at least one radar signal is outside the shared spectrum band; and determining the at least one radar signal to be out-of-band radar in response the majority of the estimated bandwidth of the at least one radar signal being outside the shared spectrum band.

According to an example embodiment, the monitored band is 125 megahertz corresponding to a bandwidth of 3537.5 megahertz to 3662.5 megahertz, 25 megahertz wider than the shared spectrum band, the shared spectrum band having a bandwidth of 3550 megahertz to 3650 megahertz.

According to an example embodiment, the shared spectrum band is a citizens broadband radio service band.

According to an example embodiment, the means are further configured to perform: selecting a height of the at least one spectrogram as a maximum of a minimum burst length across a set of types of the at least one radar signal.

According to an example embodiment, the means are further configured to perform: determining an aggregate interference of a plurality of wireless devices for an environmental sensing capability node of the apparatus; determining the aggregate interference as a sum of a respective additive white Gaussian noise corresponding to the respective wireless devices, such that the additive white Gaussian noise is a proxy for the aggregated interference of the wireless devices; and training the model using the determined aggregate interference.

According to an example embodiment, the wireless devices are operating in the shared spectrum band.

According to an example embodiment, the wireless devices are citizens broadband radio service devices.

According to an example embodiment, the means are further configured to perform: training the model using a constructed spectrogram corresponding to random interference, the constructed spectrogram having been created as a result of randomly selecting a number of artificially constructed power spectral densities that have been stacked; or training the model using a constructed spectrogram corresponding to non-random interference, the constructed spectrogram having been created as a result of randomly selecting a number of artificially constructed power spectral densities that have been stacked while keeping a spectral occupancy of interference unchanged for a number of randomly chosen consecutive time slots; and wherein the artificially constructed power spectral densities have a size corresponding to radar signals captured from at least one wireless device.

According to an example embodiment, the means are further configured to perform: training the model using a set of lower and higher frequencies of a plurality of radar signals.

According to an example embodiment, the apparatus further comprises an environmental sensing capability receiver that detects the presence of the at least one radar signal and generates the at least one sample corresponding to the at least one radar signal, wherein the environmental sensing capability receiver is an artificial intelligence radio transceiver software-defined radio environmental sensing capability radio frequency receiver.

According to an example embodiment, the apparatus further comprises multiple processor cores used to execute parallel processing such that the generating of the at least one sample, the energy determination, and the spectrogram formation are executed in parallel.

According to an example embodiment, the means are further configured to perform: monitoring an amount of time it takes to process the energy determination, the spectrogram formation, and the bandwidth estimation during a probing phase prior to training the model; and, in response to the energy determination, the spectrogram formation, or the bandwidth estimation taking longer than a duration of the observation window, using an additional processor core to speed up the process that takes longer than the observation window.

According to an example embodiment, the energy determination, the spectrogram formation, and/or the bandwidth estimation occur in parallel with the detecting of the presence of the at least one radar signal.

According to an example embodiment, the at least one radar signal is generated from a movable source.

According to an example embodiment, the apparatus is included within a spectrum controller cloud.

According to an example embodiment, the apparatus is implemented as an environmental sensing capability node within the spectrum controller cloud.

According to an example embodiment, the shared spectrum band provides access to at least one of incumbent users, priority access license users or general authorized access users.

According to an example embodiment, the means are further configured to perform: transferring the at least one sample to a memory that is shared with at least one processor and optionally a graphics processing unit of a compute node of the apparatus, the compute node used for the energy determination, the spectrogram formation, and the bandwidth estimation, wherein the means is discrete circuitry, a field programmable gate array, or an application-specific integrated circuit.

According to an example embodiment, the means comprises at least one processor; and at least one memory including computer program code, the at least one memory and computer program code configured to, with the at least one processor, cause the performance of the apparatus.

According to a third example aspect, there is provided a method comprising: generating at least one sample corresponding to at least one radar signal or at least one non-radar signal; forming at least one spectrogram using time domain and frequency domain characteristics of the at least one sample; wherein the at least one spectrogram is formed as a result of subdividing an observation window of the at least one sample into a number of time slots of a given duration, computing a power spectral density for a subset of the time slots having a higher determined energy relative to other time slots, and combining one or more computed power spectral densities of the subset; passing the at least one spectrogram to a model to detect a presence of the at least one radar signal and to further classify the at least one radar signal as either interference/noise or radar present, and to estimate a bandwidth of the at least one radar signal that has been detected; and determining the at least one radar signal to be in-band or out-of-band relative to a shared spectrum band, based on the estimated bandwidth of the at least one radar signal.

According to an example embodiment, the method further comprises determining the at least one radar signal to be out-of-band in response to the estimated bandwidth being outside of the shared spectrum band.

According to an example embodiment, the shared spectrum band is 3100 megahertz to 3400 megahertz, 3450 megahertz to 3550 megahertz, or 3550 megahertz to 3650 megahertz.

According to an example embodiment, the method further comprises estimating, using the model, the bandwidth of the at least one radar signal as a result of detecting bright spots within the at least one spectrogram, the bright spots comprising spectral components that have higher power relative to other spectral components within the computed one or more power spectral densities for the subset of the time slots.

According to an example embodiment, the method further comprises computing the one or more power spectral densities for the time slots to determine the at least one spectrogram; and removing rows from the at least one spectrogram corresponding to the time slots having relatively lower pixel values that do not indicate the presence of radar pulses, to remove non-radar rows from the at least one spectrogram to increase the density of the bright spots.

According to an example embodiment, the method further comprises detecting the at least one radar signal exceeding a threshold value of peak-to-average signal-to-interference, per megahertz; and applying an upper bound to the given duration of the time slots so that the average-to-average signal-to-interference is above a threshold, the given duration defining a width of the at least one spectrogram.

According to an example embodiment, the upper bound is a lowest value of an on duration of the at least one radar signal.

According to an example embodiment, the upper bound is chosen so that there is at least one bright spot in the at least one spectrogram, the at least one bright spot comprising spectral components that have higher power relative to other spectral components within a computed power spectral density.

According to an example embodiment, the threshold value of peak-to-average signal-to-interference, per megahertz, is 20 decibels.

According to an example embodiment, the upper bound to the given duration of the time slots is applied using Parseval's theorem.

According to an example embodiment, the at least one sample is a tuple comprising an in-phase value corresponding to the at least one radar signal, and a quadrature value corresponding to the at least one radar signal; and the power spectral density for a time slot is computed using a plurality of the tuples within the time slot, the power spectral density representing an average power at different spectral components of the at least one radar signal.

According to an example embodiment, the at least one spectrogram is a matrix having a first dimension corresponding to the number of time slots of the given duration, and a second dimension corresponding to a number of frequency bins of the power spectral density; and the at least one spectrogram is an image whose pixel values represent signal power across different frequency bins and the time slots.

According to an example embodiment, the number of frequency bins corresponds to a number of in-phase and quadrature values in the time slot.

According to an example embodiment, the spectrogram is a two-dimensional image with frequency along a width of the image, and with time along a height of the image.

According to an example embodiment, the method further comprises constraining the width of the spectrogram based on a certification requirement of an environmental sensing capability node.

According to an example embodiment, the method further comprises skipping computing the power spectral density for time slots not in the subset having the relatively higher computed energy; where a number of time slots in the subset is less than the number of time slots.

According to an example embodiment, a number of slots in the subset is equal to the number of time slots, such that no time slots are skipped when computing the one or more power spectral densities for the at least one spectrogram.

According to an example embodiment, the method further comprises computing the energy of a time slot using sample increments given with an integer, the integer being greater than or equal to one, where no sample is skipped when the integer is equal to one; and selecting a lower bound for the integer so that the energy computation occurs within a time threshold.

According to an example embodiment, the method further comprises selecting an upper bound for the integer such that detecting the presence of the at least one radar signal exceeds a radar detection threshold.

According to an example embodiment, the method further comprises determining a value for the integer and a number of slots in the subset as a result of gradually increasing the integer and reducing the number of slots in the subset until the detection of the presence of the at least one radar signal and its bandwidth estimation is within a time threshold, and until there is no memory overflow such that samples are cleared from the memory at the same rate they are placed into the memory following the generation of the at least one sample.

According to an example embodiment, the method further comprises training the model via determining how a non-deterministic aggregation of radio signals at an environmental sensing capability node affects the at least one spectrogram during spectrogram image learning.

According to an example embodiment, the method further comprises training the model using instances of out-of-band radar signals; and adjusting the instances of the out-of-band radar signals used to train the model based on a portion of radar spectrum present in a monitoring band of a radio frequency receiver.

According to an example embodiment, the model is a convolutional neural network, a regression model, and/or a you only look once model.

According to an example embodiment, the method further comprises monitoring a band centered at a center frequency of the shared spectrum band, the monitored band being wider than the shared spectrum band; determining whether a majority of an estimated bandwidth of the at least one radar signal is outside the shared spectrum band; and determining the at least one radar signal to be out-of-band radar in response the majority of the estimated bandwidth of the at least one radar signal being outside the shared spectrum band.

According to an example embodiment, the monitored band is 125 megahertz corresponding to a bandwidth of 3537.5 megahertz to 3662.5 megahertz, 25 megahertz wider than the shared spectrum band, the shared spectrum band having a bandwidth of 3550 megahertz to 3650 megahertz.

According to an example embodiment, the shared spectrum band is a citizens broadband radio service band.

According to an example embodiment, the method further comprises selecting a height of the at least one spectrogram as a maximum of a minimum burst length across a set of types of the at least one radar signal.

According to an example embodiment, the method further comprises determining an aggregate interference of a plurality of wireless devices for an environmental sensing capability node; determining the aggregate interference as a sum of a respective additive white Gaussian noise corresponding to the respective wireless devices, such that the additive white Gaussian noise is a proxy for the aggregated interference of the wireless devices; and training the model using the determined aggregate interference.

According to an example embodiment, the wireless devices are operating in the shared spectrum band.

According to an example embodiment, the wireless devices are citizens broadband radio service devices.

According to an example embodiment, the method further comprises training the model using a constructed spectrogram corresponding to random interference, the constructed spectrogram having been created as a result of randomly selecting a number of artificially constructed power spectral densities that have been stacked; or training the model using a constructed spectrogram corresponding to non-random interference, the constructed spectrogram having been created as a result of randomly selecting a number of artificially constructed power spectral densities that have been stacked while keeping a spectral occupancy of interference unchanged for a number of randomly chosen consecutive time slots; and wherein the artificially constructed power spectral densities have a size corresponding to radar signals captured from at least one wireless device.

According to an example embodiment, the method further comprises training the model using a set of lower and higher frequencies of a plurality of radar signals.

According to an example embodiment, an environmental sensing capability receiver detects the presence of the at least one radar signal and generates the at least one sample corresponding to the at least one radar signal, wherein the environmental sensing capability receiver is an artificial intelligence radio transceiver software-defined radio environmental sensing capability radio frequency receiver.

According to an example embodiment, multiple processor cores are used to execute parallel processing such that the generating of the at least one sample, the energy determination, and the spectrogram formation are executed in parallel.

According to an example embodiment, the method further comprises monitoring an amount of time it takes to process the energy determination, the spectrogram formation, and the bandwidth estimation during a probing phase prior to training the model; and in response to the energy determination, the spectrogram formation, or the bandwidth estimation taking longer than a duration of the observation window, using an additional processor core to speed up the process that takes longer than the observation window.

According to an example embodiment, the energy determination, the spectrogram formation, and/or the bandwidth estimation occur in parallel with the detecting of the presence of the at least one radar signal.

According to an example embodiment, the at least one radar signal is generated from a movable source.

According to an example embodiment, the method is performed with a spectrum controller cloud.

According to an example embodiment, The method may be implemented by an environmental sensing capability node within the spectrum controller cloud.

According to an example embodiment, the shared spectrum band provides access to at least one of incumbent users, priority access license users or general authorized access users.

According to an example embodiment, the method further comprises using circuitry to transfer the at least one sample to a memory that is shared with at least one processor and optionally a graphics processing unit of a compute node of an apparatus, the compute node used for the energy determination, the spectrogram formation, and the bandwidth estimation, wherein the circuitry is discrete circuitry, a field programmable gate array, or an application-specific integrated circuit.

According to a fourth example aspect, there is provided a computer readable medium comprising program instructions for causing an apparatus to perform at least the following: generating at least one sample corresponding to at least one radar signal or at least one non-radar signal; forming at least one spectrogram using time domain and frequency domain characteristics of the at least one sample; wherein the at least one spectrogram is formed as a result of subdividing an observation window of the at least one sample into a number of time slots of a given duration, computing a power spectral density for a subset of the time slots having a higher determined energy relative to other time slots, and combining one or more computed power spectral densities of the subset; passing the at least one spectrogram to a model to detect a presence of the at least one radar signal and to further classify the at least one radar signal as either interference/noise or radar present, and to estimate a bandwidth of the at least one radar signal that has been detected; and determining the at least one radar signal to be in-band or out-of-band relative to a shared spectrum band, based on the estimated bandwidth of the at least one radar signal.

According to an example embodiment, the computer readable medium further comprises instructions for performing the following: determining the at least one radar signal to be out-of-band in response to the estimated bandwidth being outside of the shared spectrum band.

According to an example embodiment, the shared spectrum band is 3100 megahertz to 3400 megahertz, 3450 megahertz to 3550 megahertz, or 3550 megahertz to 3650 megahertz.

According to an example embodiment, the computer readable medium further comprises instructions for performing the following: estimating, using the model, the bandwidth of the at least one radar signal as a result of detecting bright spots within the at least one spectrogram, the bright spots comprising spectral components that have higher power relative to other spectral components within the computed one or more power spectral densities for the subset of the time slots.

According to an example embodiment, the computer readable medium further comprises instructions for performing the following: computing the one or more power spectral densities for the time slots to determine the at least one spectrogram; and removing rows from the at least one spectrogram corresponding to the time slots having relatively lower pixel values that do not indicate the presence of radar pulses, to remove non-radar rows from the at least one spectrogram to increase the density of the bright spots.

According to an example embodiment, the computer readable medium further comprises instructions for performing the following: detecting the at least one radar signal exceeding a threshold value of peak-to-average signal-to-interference, per megahertz; and applying an upper bound to the given duration of the time slots so that the average-toaverage signal-to-interference is above a threshold, the given duration defining a width of the at least one spectrogram.

According to an example embodiment, the upper bound is a lowest value of an on duration of the at least one radar signal.

According to an example embodiment, the upper bound is chosen so that there is at least one bright spot in the at least one spectrogram, the at least one bright spot comprising spectral components that have higher power relative to other spectral components within a computed power spectral density.

According to an example embodiment, the threshold value of peak-to-average signal-to-interference, per megahertz, is 20 decibels.

According to an example embodiment, the upper bound to the given duration of the time slots is applied using Parseval's theorem.

According to an example embodiment, the at least one sample is a tuple comprising an in-phase value corresponding to the at least one radar signal, and a quadrature value corresponding to the at least one radar signal; and the power spectral density for a time slot is computed using a plurality of the tuples within the time slot, the power spectral density representing an average power at different spectral components of the at least one radar signal.

According to an example embodiment, the at least one spectrogram is a matrix having a first dimension corresponding to the number of time slots of the given duration, and a second dimension corresponding to a number of frequency bins of the power spectral density; and the at least one spectrogram is an image whose pixel values represent signal power across different frequency bins and the time slots.

According to an example embodiment, the number of frequency bins corresponds to a number of in-phase and quadrature values in the time slot.

According to an example embodiment, the spectrogram is a two-dimensional image with frequency along a width of the image, and with time along a height of the image.

According to an example embodiment, the computer readable medium further comprises instructions for performing the following: constraining the width of the spectrogram based on a certification requirement of an environmental sensing capability node.

According to an example embodiment, the computer readable medium further comprises instructions for performing the following: skipping computing the power spectral density for time slots not in the subset having the relatively higher computed energy; where a number of time slots in the subset is less than the number of time slots.

According to an example embodiment, a number of slots in the subset is equal to the number of time slots, such that no time slots are skipped when computing the one or more power spectral densities for the at least one spectrogram.

According to an example embodiment, the computer readable medium further comprises instructions for performing the following: computing the energy of a time slot using sample increments given with an integer, the integer being greater than or equal to one, where no sample is skipped when the integer is equal to one; and selecting a lower bound for the integer so that the energy computation occurs within a time threshold.

According to an example embodiment, the computer readable medium further comprises instructions for performing the following: selecting an upper bound for the integer such that detecting the presence of the at least one radar signal exceeds a radar detection threshold.

According to an example embodiment, the computer readable medium further comprises instructions for performing the following: determining a value for the integer and a number of slots in the subset as a result of gradually increasing the integer and reducing the number of slots in the subset until the detection of the presence of the at least one radar signal and its bandwidth estimation is within a time threshold, and until there is no memory overflow such that samples are cleared from the memory at the same rate they are placed into the memory following the generation of the at least one sample.

According to an example embodiment, the computer readable medium further comprises instructions for performing the following: training the model via determining how a non-deterministic aggregation of radio signals at an environmental sensing capability node affects the at least one spectrogram during spectrogram image learning.

According to an example embodiment, the computer readable medium further comprises instructions for performing the following: training the model using instances of out-of-band radar signals; and adjusting the instances of the out-of-band radar signals used to train the model based on a portion of radar spectrum present in a monitoring band of a radio frequency receiver.

According to an example embodiment, the model is a convolutional neural network, a regression model, and/or a you only look once model.

According to an example embodiment, the computer readable medium further comprises instructions for performing the following: monitoring a band centered at a center frequency of the shared spectrum band, the monitored band being wider than the shared spectrum band; determining whether a majority of an estimated bandwidth of the at least one radar signal is outside the shared spectrum band; and determining the at least one radar signal to be out-of-band radar in response the majority of the estimated bandwidth of the at least one radar signal being outside the shared spectrum band.

According to an example embodiment, the monitored band is 125 megahertz corresponding to a bandwidth of 3537.5 megahertz to 3662.5 megahertz, 25 megahertz wider than the shared spectrum band, the shared spectrum band having a bandwidth of 3550 megahertz to 3650 megahertz.

According to an example embodiment, the shared spectrum band is a citizens broadband radio service band.

According to an example embodiment, the computer readable medium further comprises instructions for performing the following: selecting a height of the at least one spectrogram as a maximum of a minimum burst length across a set of types of the at least one radar signal.

According to an example embodiment, the computer readable medium further comprises instructions for performing the following: determining an aggregate interference of a plurality of wireless devices for an environmental sensing capability node; determining the aggregate interference as a sum of a respective additive white Gaussian noise corresponding to the respective wireless devices, such that the additive white Gaussian noise is a proxy for the aggregated interference of the wireless devices; and training the model using the determined aggregate interference.

According to an example embodiment, the wireless devices are operating in the shared spectrum band.

According to an example embodiment, the wireless devices are citizens broadband radio service devices.

According to an example embodiment, the computer readable medium further comprises instructions for performing the following: training the model using a constructed spectrogram corresponding to random interference, the constructed spectrogram having been created as a result of randomly selecting a number of artificially constructed power spectral densities that have been stacked; or training the model using a constructed spectrogram corresponding to non-random interference, the constructed spectrogram having been created as a result of randomly selecting a number of artificially constructed power spectral densities that have been stacked while keeping a spectral occupancy of interference unchanged for a number of randomly chosen consecutive time slots; and wherein the artificially constructed power spectral densities have a size corresponding to radar signals captured from at least one wireless device.

According to an example embodiment, the computer readable medium further comprises instructions for performing the following: training the model using a set of lower and higher frequencies of a plurality of radar signals.

According to an example embodiment, an environmental sensing capability receiver detects the presence of the at least one radar signal and generates the at least one sample corresponding to the at least one radar signal, wherein the environmental sensing capability receiver is an artificial intelligence radio transceiver software-defined radio environmental sensing capability radio frequency receiver.

According to an example embodiment, multiple processor cores are used to execute parallel processing such that the generating of the at least one sample, the energy determination, and the spectrogram formation are executed in parallel.

According to an example embodiment, the computer readable medium further comprises instructions for performing the following: monitoring an amount of time it takes to process the energy determination, the spectrogram formation, and the bandwidth estimation during a probing phase prior to training the model; and in response to the energy determination, the spectrogram formation, or the bandwidth estimation taking longer than a duration of the observation window, using an additional processor core to speed up the process that takes longer than the observation window.

According to an example embodiment, the energy determination, the spectrogram formation, and/or the bandwidth estimation occur in parallel with the detecting of the presence of the at least one radar signal.

According to an example embodiment, the at least one radar signal is generated from a movable source.

According to an example embodiment, the apparatus is included within a spectrum controller cloud.

According to an example embodiment, the apparatus is implemented as an environmental sensing capability node within the spectrum controller cloud.

According to an example embodiment, the shared spectrum band provides access to at least one of incumbent users, priority access license users or general authorized access users.

According to an example embodiment, circuitry is used in the apparatus to transfer the at least one sample to a memory that is shared with at least one processor and optionally a graphics processing unit of a compute node of the apparatus, the compute node used for the energy determination, the spectrogram formation, and the bandwidth estimation, wherein the circuitry is discrete circuitry, a field programmable gate array, or an application-specific integrated circuit.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, this description is intended to embrace all such alternatives, modifications and variances which fall within the scope of the appended claims.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The expression "at least one of A or B" in this document means A, or B, or both A and B.

The following acronyms and abbreviations that may be found in the specification and/or the drawing figures are defined as follows:

3GPP third generation partnership project
4G fourth generation
5G fifth generation
6G sixth generation
5GC 5G core network
AIR-T artificial intelligence radio transceiver
AMF access and mobility management function
ASIC application-specific integrated circuit
AWGN additive white Gaussian noise
category A lower power base station
category B a CBSD with higher maximum power limits compared with Category A devices
CBRS citizens broadband radio service
CBSD CBRS device (e.g. an eNB)
CFR Code of Federal Regulations
CNN convolutional neural network
CNS Computer and Network Systems
COTS commercial-off-the-shelf
CPU central processing unit
CU central unit or centralized unit
cXM coexistence manager
DL downlink
DoD Department of Defense
DP domain proxy
DSP digital signal processor
DU distributed unit
E2E end-to-end
eNB or eNodeB evolved Node B (e.g., an LTE base station)
EN-DC E-UTRA-NR dual connectivity
en-gNB node providing NR user plane and control plane protocol terminations towards the UE, and acting as a secondary node in EN-DC
EPC evolved packet core
ESC environmental sensing capability
E-UTRA evolved universal terrestrial radio access, i.e., the LTE radio access technology
F1 control interface between the CU and the DU
FCC Federal Communications Commission
FFT fast Fourier transform
FPGA field-programmable gate array
FSS fixed-satellite service
GAA general/generalized authorized access
gNB base station for 5G/NR, i.e., a node providing NR user plane and control plane protocol terminations towards the UE, and connected via the NG interface to the 5GC
GPU graphics processing unit I in-phase
I/F interface
I/O input/output
IQ in-phase I and phase-quadrature Q
IU incumbent user(s)
LMF location management function
LTE long term evolution (4G)
MAC medium access control
MME mobility management entity
MNO mobile network operator
MSO multiple-system operator
NCE network control element
ng or NG new generation
ng-eNB new generation eNB
NG-RAN new generation radio access network
No. number
NR new radio (5G)
NSF National Science Foundation
N/W network
O/P output
OoB out-of-band
OSS operations support systems
PAL priority access license
PCIe peripheral component interconnect express
PDA personal digital assistant
PDCP packet data convergence protocol
PHY physical layer
PSD power spectral density
Q phase-quadrature
RAN radio access network
RF radio frequency
RLC radio link control
RRC radio resource control (protocol)
RRH remote radio head
RU radio unit
Rx receiver or reception
SA spectrum analytics
SAS spectrum access system
SC spectrum controller
SDR software-defined radio
SGW serving gateway
SIL spectrogram image learning
SIR signal-to-interference
SON self-organizing/optimizing network
SU secondary user(s)
SVM support vector machine
TDD time division duplexing
TRP transmission and/or reception point
Tx transmitter or transmission
UE user equipment (e.g., a wireless, typically mobile device)
UL uplink
US United States
UPF user plane function
WInnForum wireless innovation forum
X2 network interface between RAN nodes and between RAN and the core network
Xn network interface between NG-RAN nodes
YOLO you only look once

What is claimed is:

1. A method comprising:

generating at least one sample corresponding to at least one radar signal or at least one non-radar signal;

forming at least one spectrogram using time domain and frequency domain characteristics of the at least one sample;

wherein the at least one spectrogram is formed as a result of subdividing an observation window of the at least one sample into a number of time slots of a given duration, computing a power spectral density for a subset of the time slots having a higher determined energy relative to other time slots, and combining one or more computed power spectral densities of the subset;

passing the at least one spectrogram to a model to detect a presence of the at least one radar signal and to further classify the at least one radar signal as either interference/noise or radar present, and to estimate a bandwidth of the at least one radar signal that has been detected;

determining the at least one radar signal to be in-band or out-of-band relative to a shared spectrum band, based on the estimated bandwidth of the at least one radar signal;

detecting the at least one radar signal exceeding a threshold value of peak-to-average signal-to-interference, per megahertz; and applying an upper bound to the given duration of the time slots so that the average-to-average signal-to-interference is above a threshold, the given duration defining a width of the at least one spectrogram to provide deep-learning-based transmitter detection capability instantiated for an environmental sensing capability sensor design for a shared spectrum band.

2. The method of claim 1, further comprising:

determining the at least one radar signal to be out-of-band in response to the estimated bandwidth being outside of the shared spectrum band.

3. The method of claim 1, further comprising:

estimating, using the model, the bandwidth of the at least one radar signal as a result of detecting bright spots within the at least one spectrogram, the bright spots comprising spectral components that have higher power relative to other spectral components within the computed one or more power spectral densities for the subset of the time slots.

4. The method of claim 1, wherein:

the at least one sample is a tuple comprising an in-phase value corresponding to the at least one radar signal, and a quadrature value corresponding to the at least one radar signal; and the power spectral density for a time slot is computed using a plurality of the tuples within the time slot, the power spectral density representing an average power at different spectral components of the at least one radar signal.

5. The method of claim 1, wherein:

the at least one spectrogram is a matrix having a first dimension corresponding to the number of time slots of the given duration, and a second dimension corresponding to a number of frequency bins of the power spectral density; and the at least one spectrogram is an image whose pixel values represent signal power across different frequency bins and the time slots.

6. The method of claim 1, further comprising:

skipping computing the power spectral density for time slots not in the subset having the relatively higher computed energy;

where a number of time slots in the subset is less than the number of time slots.

7. The method of claim 1, further comprising:

computing the energy of a time slot using sample increments given with an integer, the integer being greater than or equal to one, where no sample is skipped when the integer is equal to one; and selecting a lower bound for the integer so that the energy computation occurs within a time threshold.

8. The method of claim 1, wherein the model is a convolutional neural network, a regression model, and/or a you only look once model.

9. The method of claim 1, wherein multiple processor cores are used to execute parallel processing such that the generating of the at least one sample, the energy determination, and the spectrogram formation are executed in parallel.

10. The method of claim 1, wherein the energy determination, the spectrogram formation, and/or the bandwidth estimation occur in parallel with the detecting of the presence of the at least one radar signal.

11. A computer readable medium comprising program instructions for causing an apparatus to perform at least the following:

generating at least one sample corresponding to at least one radar signal or at least one non-radar signal;

forming at least one spectrogram using time domain and frequency domain characteristics of the at least one sample;

wherein the at least one spectrogram is formed as a result of subdividing an observation window of the at least one sample into a number of time slots of a given duration, computing a power spectral density for a subset of the time slots having a higher determined energy relative to other time slots, and combining one or more computed power spectral densities of the subset;

passing the at least one spectrogram to a model to detect a presence of the at least one radar signal and to further classify the at least one radar signal as either interference/noise or radar present, and to estimate a bandwidth of the at least one radar signal that has been detected; and determining the at least one radar signal to be in-band or out-of-band relative to a shared spectrum band, based on the estimated bandwidth of the at least one radar signal.

* * * * *